(12) United States Patent
Leber

(10) Patent No.: US 8,371,618 B2
(45) Date of Patent: Feb. 12, 2013

(54) HIDDEN PIVOT ATTACHMENT FOR SHOWERS AND METHOD OF MAKING SAME

(75) Inventor: Leland C. Leber, Fort Collins, CO (US)

(73) Assignee: Water Pik, Inc., Fort Collins, CO (US)

( * ) Notice: Subject to any disclaimer, the term of this patent is extended or adjusted under 35 U.S.C. 154(b) by 865 days.

(21) Appl. No.: 12/112,751

(22) Filed: Apr. 30, 2008

(65) Prior Publication Data

US 2008/0272591 A1    Nov. 6, 2008

Related U.S. Application Data

(60) Provisional application No. 60/916,092, filed on May 4, 2007, provisional application No. 60/916,146, filed on May 4, 2007, provisional application No. 60/916,219, filed on May 4, 2007.

(51) Int. Cl.
    *F16L 27/04*    (2006.01)
(52) U.S. Cl. .......... 285/261; 285/8; 285/146.1; 285/272
(58) Field of Classification Search ............... 285/146.1, 285/261, 282, 353–354, 384, 386–387, 8, 285/272; 4/492, 568, 590, 615, 657, 671; 239/587.4
See application file for complete search history.

(56) References Cited

U.S. PATENT DOCUMENTS

| | | | |
|---|---|---|---|
| 203,094 A | 4/1878 | Wakeman |
| 204,333 A | 5/1878 | Josias |
| 309,349 A | 12/1884 | Hart |
| 428,023 A | 5/1890 | Schoff |
| 432,712 A | 7/1890 | Taylor |
| 445,250 A | 1/1891 | Lawless |
| 453,109 A | 5/1891 | Dreisorner |
| 486,986 A | 11/1892 | Schinke |
| 566,384 A | 8/1896 | Engelhart |
| 566,410 A | 8/1896 | Schinke |
| 570,405 A | 10/1896 | Jerguson et al. |
| 694,888 A | 3/1902 | Pfluger |
| 800,802 A | 10/1905 | Franquist |
| 832,523 A | 10/1906 | Andersson |
| 835,678 A | 11/1906 | Hammond |
| 845,540 A | 2/1907 | Ferguson |
| 854,094 A | 5/1907 | Klein |
| 926,929 A | 7/1909 | Dusseau |
| 1,001,842 A | 8/1911 | Greenfield |
| 1,003,037 A | 9/1911 | Crowe |
| 1,018,143 A | 2/1912 | Vissering |

(Continued)

FOREIGN PATENT DOCUMENTS

| | | |
|---|---|---|
| CA | 659510 | 3/1963 |
| CA | 2341041 | 8/1999 |

(Continued)

OTHER PUBLICATIONS

Color Copy, Labeled 1A, Gemlo, available at least as early as Dec. 2, 1998.

(Continued)

*Primary Examiner* — Aaron Dunwoody
*Assistant Examiner* — Fannie Kee
(74) *Attorney, Agent, or Firm* — Dorsey & Whitney LLP

(57) ABSTRACT

A water supply attachment is a spherically-shaped pivot attachment having a hollow passage extending between its opposing ends that includes a threaded portion for coupling to water supplies. The water supply attachment can be a hidden pivot attachment usable in various shower assemblies. The hidden pivot attachment may be used in combination with a seal cup and an attachment nut, such that the hidden pivot attachment closely fits within the void spaces of the seal cup and attachment nut, enabling the hidden pivot attachment to form a seal with the seal cup.

7 Claims, 14 Drawing Sheets

U.S. PATENT DOCUMENTS

| | | | |
|---|---|---|---|
| 1,046,573 A | 12/1912 | Ellis |
| 1,130,520 A | 3/1915 | Kenney |
| 1,203,466 A | 10/1916 | Benson |
| 1,217,254 A | 2/1917 | Winslow |
| 1,218,895 A | 3/1917 | Porter |
| 1,255,577 A | 2/1918 | Berry |
| 1,260,181 A | 3/1918 | Garnero |
| 1,276,117 A | 8/1918 | Riebe |
| 1,284,099 A | 11/1918 | Harris |
| 1,327,428 A | 1/1920 | Gregory |
| 1,451,800 A | 4/1923 | Agner |
| 1,459,582 A | 6/1923 | Dubee |
| 1,469,528 A | 10/1923 | Owens |
| 1,500,921 A | 7/1924 | Bramson et al. |
| 1,560,789 A | 11/1925 | Johnson et al. |
| 1,597,477 A | 8/1926 | Panhorst |
| 1,633,531 A | 6/1927 | Keller |
| 1,692,394 A | 11/1928 | Sundh |
| 1,695,263 A | 12/1928 | Jacques |
| 1,724,147 A | 8/1929 | Russell |
| 1,724,161 A | 8/1929 | Wuesthoff |
| 1,736,160 A | 11/1929 | Jonsson |
| 1,754,127 A | 4/1930 | Srulowitz |
| 1,758,115 A | 5/1930 | Kelly |
| 1,778,658 A | 10/1930 | Baker |
| 1,821,274 A | 9/1931 | Plummer |
| 1,849,517 A | 3/1932 | Fraser |
| 1,890,156 A | 12/1932 | Konig |
| 1,906,575 A | 5/1933 | Goeriz |
| 1,934,553 A | 11/1933 | Mueller et al. |
| 1,946,207 A | 2/1934 | Haire |
| 2,011,446 A | 8/1935 | Judell |
| 2,024,930 A | 12/1935 | Judell |
| 2,033,467 A | 3/1936 | Groeniger |
| 2,044,445 A | 6/1936 | Price et al. |
| 2,085,854 A | 7/1937 | Hathaway et al. |
| 2,096,912 A | 10/1937 | Morris |
| 2,117,152 A | 5/1938 | Crosti |
| D113,439 S | 2/1939 | Reinecke |
| 2,196,783 A | 4/1940 | Shook |
| 2,197,667 A | 4/1940 | Shook |
| 2,216,149 A | 10/1940 | Weiss |
| D126,433 S | 4/1941 | Enthof |
| 2,251,192 A | 7/1941 | Krumsiek et al. |
| 2,268,263 A | 12/1941 | Newell et al. |
| 2,285,831 A | 6/1942 | Pennypacker |
| 2,342,757 A | 2/1944 | Roser |
| 2,402,741 A | 6/1946 | Draviner |
| D147,258 S | 8/1947 | Becker |
| D152,584 S | 2/1949 | Becker |
| 2,467,954 A | 4/1949 | Becker |
| 2,546,348 A | 3/1951 | Schuman |
| 2,567,642 A | 9/1951 | Penshaw |
| 2,581,129 A | 1/1952 | Muldoon |
| D166,073 S | 3/1952 | Dunkelberger |
| 2,648,762 A | 8/1953 | Dunkelberger |
| 2,664,271 A | 12/1953 | Arutunoff |
| 2,671,693 A | 3/1954 | Hyser et al. |
| 2,676,806 A | 4/1954 | Bachman |
| 2,679,575 A | 5/1954 | Haberstump |
| 2,680,358 A | 6/1954 | Zublin |
| 2,726,120 A | 12/1955 | Bletcher et al. |
| 2,759,765 A | 8/1956 | Pawley |
| 2,776,168 A | 1/1957 | Schweda |
| 2,792,847 A | 5/1957 | Spencer |
| 2,873,999 A | 2/1959 | Webb |
| 2,930,505 A | 3/1960 | Meyer |
| 2,931,672 A | 4/1960 | Merritt et al. |
| 2,935,265 A | 5/1960 | Richter |
| 2,949,242 A | 8/1960 | Blumberg et al. |
| 2,957,587 A | 10/1960 | Tobin |
| 2,966,311 A | 12/1960 | Davis |
| D190,295 S | 5/1961 | Becker |
| 2,992,437 A | 7/1961 | Nelson et al. |
| 3,007,648 A | 11/1961 | Fraser |
| D192,935 S | 5/1962 | Becker |
| 3,032,357 A | 5/1962 | Shames et al. |
| 3,034,809 A | 5/1962 | Greenberg |
| 3,037,799 A | 6/1962 | Mulac |
| 3,081,339 A | 3/1963 | Green et al. |
| 3,092,333 A | 6/1963 | Gaiotto |
| 3,098,508 A | 7/1963 | Gerdes |
| 3,103,723 A | 9/1963 | Becker |
| 3,104,815 A | 9/1963 | Schultz |
| 3,104,827 A | 9/1963 | Aghnides |
| 3,111,277 A | 11/1963 | Grimsley |
| 3,112,073 A | 11/1963 | Larson et al. |
| 3,143,857 A | 8/1964 | Eaton |
| 3,196,463 A | 7/1965 | Farneth |
| 3,231,200 A | 1/1966 | Heald |
| 3,236,545 A | 2/1966 | Parkes et al. |
| 3,239,152 A | 3/1966 | Bachli et al. |
| 3,266,059 A | 8/1966 | Stelle |
| 3,272,437 A | 9/1966 | Coson |
| 3,273,359 A | 9/1966 | Fregeolle |
| 3,306,634 A | 2/1967 | Groves et al. |
| 3,323,148 A | 6/1967 | Burnon |
| 3,329,967 A | 7/1967 | Martinez et al. |
| 3,341,132 A | 9/1967 | Parkison |
| 3,342,419 A | 9/1967 | Weese |
| 3,344,994 A | 10/1967 | Fife |
| 3,363,842 A | 1/1968 | Burns |
| 3,383,051 A | 5/1968 | Fiorentino |
| 3,389,925 A | 6/1968 | Gottschald |
| 3,393,311 A | 7/1968 | Dahl |
| 3,393,312 A | 7/1968 | Dahl |
| 3,404,410 A | 10/1968 | Sumida |
| 3,492,029 A | 1/1970 | French et al. |
| 3,516,611 A | 6/1970 | Piggott |
| 3,546,961 A | 12/1970 | Marton |
| 3,550,863 A | 12/1970 | McDermott |
| 3,552,436 A | 1/1971 | Stewart |
| 3,565,116 A | 2/1971 | Gabin |
| 3,566,917 A | 3/1971 | White |
| 3,580,513 A | 5/1971 | Martin |
| 3,584,822 A | 6/1971 | Oram |
| 3,596,835 A | 8/1971 | Smith et al. |
| 3,612,577 A | 10/1971 | Pope |
| 3,637,143 A | 1/1972 | Shames et al. |
| 3,641,333 A | 2/1972 | Gendron |
| 3,647,144 A | 3/1972 | Parkison et al. |
| 3,663,044 A | 5/1972 | Contreras et al. |
| 3,669,470 A | 6/1972 | Deurloo |
| 3,672,648 A | 6/1972 | Price |
| 3,682,392 A | 8/1972 | Kint |
| 3,685,745 A | 8/1972 | Peschcke-Koedt |
| D224,834 S | 9/1972 | Laudell |
| 3,711,029 A | 1/1973 | Bartlett |
| 3,722,798 A | 3/1973 | Bletcher et al. |
| 3,722,799 A | 3/1973 | Rauh |
| 3,731,084 A | 5/1973 | Trevorrow |
| 3,754,779 A | 8/1973 | Peress |
| D228,622 S | 10/1973 | Jublin |
| 3,762,648 A | 10/1973 | Deines et al. |
| 3,768,735 A | 10/1973 | Ward |
| 3,786,995 A | 1/1974 | Manoogian et al. |
| 3,801,019 A | 4/1974 | Trenary et al. |
| 3,810,580 A | 5/1974 | Rauh |
| 3,826,454 A | 7/1974 | Zieger |
| 3,840,734 A | 10/1974 | Oram |
| 3,845,291 A | 10/1974 | Portyrata |
| 3,860,271 A | 1/1975 | Rodgers |
| 3,861,719 A | 1/1975 | Hand |
| 3,865,310 A | 2/1975 | Elkins et al. |
| 3,869,151 A | 3/1975 | Fletcher et al. |
| 3,896,845 A | 7/1975 | Parker |
| 3,902,671 A | 9/1975 | Symmons |
| 3,910,277 A | 10/1975 | Zimmer |
| D237,708 S | 11/1975 | Grohe |
| 3,929,164 A | 12/1975 | Richter |
| 3,929,287 A | 12/1975 | Givler et al. |
| 3,958,756 A | 5/1976 | Trenary et al. |
| D240,322 S | 6/1976 | Staub |
| 3,967,783 A | 7/1976 | Halsted et al. |
| 3,979,096 A | 9/1976 | Zieger |
| 3,997,116 A | 12/1976 | Moen |
| 3,998,390 A | 12/1976 | Peterson et al. |

| | | | | | |
|---|---|---|---|---|---|
| 3,999,714 A | 12/1976 | Lang | 4,598,866 A | 7/1986 | Cammack et al. |
| 4,005,880 A | 2/1977 | Anderson et al. | 4,614,303 A | 9/1986 | Moseley, Jr. et al. |
| 4,006,920 A | 2/1977 | Sadler et al. | 4,616,298 A | 10/1986 | Bolson |
| 4,023,782 A | 5/1977 | Eifer | 4,618,100 A | 10/1986 | White et al. |
| 4,042,984 A | 8/1977 | Butler | 4,629,124 A | 12/1986 | Gruber |
| 4,045,054 A | 8/1977 | Arnold | 4,629,125 A | 12/1986 | Liu |
| D245,858 S | 9/1977 | Grube | 4,643,463 A | 2/1987 | Halling et al. |
| D245,860 S | 9/1977 | Grube | 4,645,244 A | 2/1987 | Curtis |
| 4,068,801 A | 1/1978 | Leutheuser | RE32,386 E | 3/1987 | Hunter |
| 4,081,135 A | 3/1978 | Tomaro | 4,650,120 A | 3/1987 | Kress |
| 4,084,271 A | 4/1978 | Ginsberg | 4,650,470 A | 3/1987 | Epstein |
| 4,091,998 A | 5/1978 | Peterson | 4,652,025 A | 3/1987 | Conroy, Sr. |
| D249,356 S | 9/1978 | Nagy | 4,654,900 A | 4/1987 | McGhee |
| 4,117,979 A | 10/1978 | Lagarelli et al. | 4,657,185 A | 4/1987 | Rundzaitis |
| 4,129,257 A | 12/1978 | Eggert | 4,669,666 A | 6/1987 | Finkbeiner |
| 4,130,120 A | 12/1978 | Kohler, Jr. | 4,669,757 A | 6/1987 | Bartholomew |
| 4,131,233 A | 12/1978 | Koenig | 4,674,687 A | 6/1987 | Smith et al. |
| 4,133,486 A | 1/1979 | Fanella | 4,683,917 A | 8/1987 | Bartholomew |
| 4,135,549 A | 1/1979 | Baker | 4,703,893 A | 11/1987 | Gruber |
| D251,045 S | 2/1979 | Grube | 4,717,180 A | 1/1988 | Roman |
| 4,141,502 A | 2/1979 | Grohe | 4,719,654 A | 1/1988 | Blessing |
| 4,151,955 A | 5/1979 | Stouffer | 4,733,337 A | 3/1988 | Bieberstein |
| 4,151,957 A | 5/1979 | Gecewicz et al. | D295,437 S | 4/1988 | Fabian |
| 4,162,801 A | 7/1979 | Kresky et al. | 4,739,801 A | 4/1988 | Kimura et al. |
| 4,165,837 A | 8/1979 | Rundzaitis | 4,749,126 A | 6/1988 | Kessener et al. |
| 4,167,196 A | 9/1979 | Morris | D296,582 S | 7/1988 | Haug et al. |
| 4,174,822 A | 11/1979 | Larsson | 4,754,928 A | 7/1988 | Rogers et al. |
| 4,185,781 A | 1/1980 | O'Brien | D297,160 S | 8/1988 | Robbins |
| 4,190,207 A | 2/1980 | Fienhold et al. | 4,764,047 A | 8/1988 | Johnston et al. |
| 4,191,332 A | 3/1980 | De Langis et al. | 4,778,104 A | 10/1988 | Fisher |
| 4,203,550 A | 5/1980 | On | 4,787,591 A | 11/1988 | Villacorta |
| 4,209,132 A | 6/1980 | Kwan | 4,790,294 A | 12/1988 | Allred, III et al. |
| D255,626 S | 7/1980 | Grube | 4,801,091 A | 1/1989 | Sandvik |
| 4,219,160 A | 8/1980 | Allred, Jr. | 4,809,369 A | 3/1989 | Bowden |
| 4,221,338 A | 9/1980 | Shames et al. | 4,839,599 A | 6/1989 | Fischer |
| 4,239,409 A | 12/1980 | Osrwo | 4,842,059 A | 6/1989 | Tomek |
| 4,243,253 A | 1/1981 | Rogers, Jr. | D302,325 S | 7/1989 | Charet et al. |
| 4,244,526 A | 1/1981 | Arth | 4,850,616 A | 7/1989 | Pava |
| D258,677 S | 3/1981 | Larsson | 4,854,499 A | 8/1989 | Neuman |
| 4,254,914 A | 3/1981 | Shames et al. | 4,856,822 A | 8/1989 | Parker |
| 4,258,414 A | 3/1981 | Sokol | 4,865,362 A | 9/1989 | Holden |
| 4,272,022 A | 6/1981 | Evans | D303,830 S | 10/1989 | Ramsey et al. |
| 4,274,400 A | 6/1981 | Baus | 4,871,196 A | 10/1989 | Kingsford |
| 4,282,612 A | 8/1981 | King | 4,896,658 A | 1/1990 | Yonekubo et al. |
| D261,300 S | 10/1981 | Klose | D306,351 S | 2/1990 | Charet et al. |
| D261,417 S | 10/1981 | Klose | 4,901,927 A | 2/1990 | Valdivia |
| 4,303,201 A | 12/1981 | Elkins et al. | 4,903,178 A | 2/1990 | Englot et al. |
| 4,319,608 A | 3/1982 | Raikov et al. | 4,903,897 A | 2/1990 | Hayes |
| 4,330,089 A | 5/1982 | Finkbeiner | 4,903,922 A | 2/1990 | Harris, III |
| D266,212 S | 9/1982 | Haug et al. | 4,907,137 A | 3/1990 | Schladitz et al. |
| 4,350,298 A | 9/1982 | Tada | 4,907,744 A | 3/1990 | Jousson |
| 4,353,508 A | 10/1982 | Butterfield et al. | 4,909,435 A | 3/1990 | Kidouchi et al. |
| 4,358,056 A | 11/1982 | Greenhut et al. | 4,914,759 A | 4/1990 | Goff |
| D267,582 S | 1/1983 | Mackay et al. | 4,946,202 A | 8/1990 | Perricone |
| D268,359 S | 3/1983 | Klose | 4,951,329 A | 8/1990 | Shaw |
| D268,442 S | 3/1983 | Darmon | 4,953,585 A | 9/1990 | Rollini et al. |
| D268,611 S | 4/1983 | Klose | 4,964,573 A | 10/1990 | Lipski |
| 4,383,554 A | 5/1983 | Merriman | 4,972,048 A | 11/1990 | Martin |
| 4,396,797 A | 8/1983 | Sakuragi et al. | D313,267 S | 12/1990 | Lenci et al. |
| 4,398,669 A | 8/1983 | Fienhold | 4,976,460 A | 12/1990 | Newcombe et al. |
| 4,425,965 A | 1/1984 | Bayh, III et al. | D314,246 S | 1/1991 | Bache |
| 4,432,392 A | 2/1984 | Paley | D315,191 S | 3/1991 | Mikol |
| D274,457 S | 6/1984 | Haug | 4,998,673 A | 3/1991 | Pilolla |
| 4,461,052 A | 7/1984 | Mostul | 5,004,158 A | 4/1991 | Halem et al. |
| 4,465,308 A | 8/1984 | Martini | D317,348 S | 6/1991 | Geneve et al. |
| 4,467,964 A | 8/1984 | Kaeser | 5,020,570 A | 6/1991 | Cotter |
| 4,495,550 A | 1/1985 | Visciano | 5,022,103 A | 6/1991 | Faist |
| 4,527,745 A | 7/1985 | Butterfield et al. | 5,032,015 A | 7/1991 | Christianson |
| 4,540,202 A | 9/1985 | Amphoux et al. | 5,033,528 A | 7/1991 | Volcani |
| 4,545,081 A | 10/1985 | Nestor et al. | 5,033,897 A | 7/1991 | Chen |
| 4,553,775 A | 11/1985 | Halling | D319,294 S | 8/1991 | Kohler, Jr. et al. |
| D281,820 S | 12/1985 | Oba et al. | D320,064 S | 9/1991 | Presman |
| 4,561,593 A | 12/1985 | Cammack et al. | 5,046,764 A | 9/1991 | Kimura et al. |
| 4,564,889 A | 1/1986 | Bolson | D321,062 S | 10/1991 | Bonbright |
| 4,571,003 A | 2/1986 | Roling et al. | 5,058,804 A | 10/1991 | Yonekubo et al. |
| 4,572,232 A | 2/1986 | Gruber | D322,119 S | 12/1991 | Haug et al. |
| D283,645 S | 4/1986 | Tanaka | D322,681 S | 12/1991 | Yuen |
| 4,587,991 A | 5/1986 | Chorkey | 5,070,552 A | 12/1991 | Gentry et al. |
| 4,588,130 A | 5/1986 | Trenary et al. | D323,545 S | 1/1992 | Ward |

| Patent No. | Date | Name |
|---|---|---|
| 5,082,019 A | 1/1992 | Tetrault |
| 5,086,878 A | 2/1992 | Swift |
| 5,090,624 A | 2/1992 | Rogers |
| 5,100,055 A | 3/1992 | Rokitenetz et al. |
| D325,769 S | 4/1992 | Haug et al. |
| D325,770 S | 4/1992 | Haug et al. |
| 5,103,384 A | 4/1992 | Drohan |
| D326,311 S | 5/1992 | Lenci et al. |
| D327,115 S | 6/1992 | Rogers |
| 5,121,511 A | 6/1992 | Sakamoto et al. |
| D327,729 S | 7/1992 | Rogers |
| 5,127,580 A | 7/1992 | Fu-I |
| 5,134,251 A | 7/1992 | Martin |
| D328,944 S | 8/1992 | Robbins |
| 5,141,016 A | 8/1992 | Nowicki |
| D329,504 S | 9/1992 | Yuen |
| 5,143,300 A | 9/1992 | Cutler |
| 5,145,114 A | 9/1992 | Monch |
| 5,148,556 A | 9/1992 | Bottoms et al. |
| D330,068 S | 10/1992 | Haug et al. |
| D330,408 S | 10/1992 | Thacker |
| D330,409 S | 10/1992 | Raffo |
| 5,153,976 A | 10/1992 | Benchaar et al. |
| 5,154,355 A | 10/1992 | Gonzalez |
| 5,154,483 A | 10/1992 | Zeller |
| 5,161,567 A | 11/1992 | Humpert |
| 5,163,752 A | 11/1992 | Copeland et al. |
| 5,171,429 A | 12/1992 | Yasuo |
| 5,172,860 A | 12/1992 | Yuch |
| 5,172,862 A | 12/1992 | Heimann et al. |
| 5,172,866 A | 12/1992 | Ward |
| D332,303 S | 1/1993 | Klose |
| D332,994 S | 2/1993 | Huen |
| D333,339 S | 2/1993 | Klose |
| 5,197,767 A | 3/1993 | Kimura et al. |
| D334,794 S | 4/1993 | Klose |
| D335,171 S | 4/1993 | Lenci et al. |
| 5,201,468 A | 4/1993 | Freier et al. |
| 5,206,963 A | 5/1993 | Wiens |
| 5,207,499 A | 5/1993 | Vajda et al. |
| 5,213,267 A | 5/1993 | Heimann et al. |
| 5,220,697 A | 6/1993 | Birchfield |
| D337,839 S | 7/1993 | Zeller |
| 5,228,625 A | 7/1993 | Grassberger |
| 5,230,106 A | 7/1993 | Henkin et al. |
| D338,542 S | 8/1993 | Yuen |
| 5,232,162 A | 8/1993 | Chih |
| D339,492 S | 9/1993 | Klose |
| D339,627 S | 9/1993 | Klose |
| D339,848 S | 9/1993 | Gottwald |
| 5,246,169 A | 9/1993 | Heimann et al. |
| 5,246,301 A | 9/1993 | Hirasawa |
| D340,376 S | 10/1993 | Klose |
| 5,253,670 A | 10/1993 | Perrott |
| 5,253,807 A | 10/1993 | Newbegin |
| 5,254,809 A | 10/1993 | Martin |
| D341,007 S | 11/1993 | Haug et al. |
| D341,191 S | 11/1993 | Klose |
| D341,220 S | 11/1993 | Eagan |
| 5,263,646 A | 11/1993 | McCauley |
| 5,265,833 A | 11/1993 | Heimann et al. |
| 5,268,826 A | 12/1993 | Greene |
| 5,276,596 A | 1/1994 | Krenzel |
| 5,277,391 A | 1/1994 | Haug et al. |
| 5,286,071 A | 2/1994 | Storage |
| 5,288,110 A | 2/1994 | Allread |
| 5,294,054 A | 3/1994 | Benedict et al. |
| 5,297,735 A | 3/1994 | Heimann et al. |
| 5,297,739 A | 3/1994 | Allen |
| D345,811 S | 4/1994 | Van Deursen et al. |
| D346,426 S | 4/1994 | Warshawsky |
| D346,428 S | 4/1994 | Warshawsky |
| D346,430 S | 4/1994 | Warshawsky |
| D347,262 S | 5/1994 | Black et al. |
| D347,265 S | 5/1994 | Gottwald |
| 5,316,216 A | 5/1994 | Cammack et al. |
| D348,720 S | 7/1994 | Haug et al. |
| 5,329,650 A | 7/1994 | Zaccai et al. |
| D349,947 S | 8/1994 | Hing-Wah |
| 5,333,787 A | 8/1994 | Smith et al. |
| 5,333,789 A | 8/1994 | Garneys |
| 5,340,064 A | 8/1994 | Heimann et al. |
| 5,340,165 A | 8/1994 | Sheppard |
| D350,808 S | 9/1994 | Warshawsky |
| 5,344,080 A | 9/1994 | Matsui |
| 5,349,987 A | 9/1994 | Shieh |
| 5,356,076 A | 10/1994 | Bishop |
| 5,356,077 A | 10/1994 | Shames |
| D352,092 S | 11/1994 | Warshawsky |
| D352,347 S | 11/1994 | Dannenberg |
| D352,766 S | 11/1994 | Hill et al. |
| 5,368,235 A | 11/1994 | Drozdoff et al. |
| 5,369,556 A | 11/1994 | Zeller |
| 5,370,427 A | 12/1994 | Hoelle et al. |
| 5,385,500 A | 1/1995 | Schmidt |
| D355,242 S | 2/1995 | Warshawsky |
| D355,703 S | 2/1995 | Duell |
| D356,626 S | 3/1995 | Wang |
| 5,397,064 A | 3/1995 | Heitzman |
| 5,398,872 A | 3/1995 | Joubran |
| 5,398,977 A | 3/1995 | Berger et al. |
| 5,402,812 A | 4/1995 | Moineau et al. |
| 5,405,089 A | 4/1995 | Heimann et al. |
| 5,414,879 A | 5/1995 | Hiraishi et al. |
| 5,423,348 A | 6/1995 | Jezek et al. |
| 5,433,384 A | 7/1995 | Chan et al. |
| D361,399 S | 8/1995 | Carbone et al. |
| D361,623 S | 8/1995 | Huen |
| 5,441,075 A | 8/1995 | Clare |
| 5,449,206 A | 9/1995 | Lockwood |
| D363,360 S | 10/1995 | Santarsiero |
| 5,454,809 A | 10/1995 | Janssen |
| 5,468,057 A | 11/1995 | Megerle et al. |
| D364,935 S | 12/1995 | deBlois |
| D365,625 S | 12/1995 | Bova |
| D365,646 S | 12/1995 | deBlois |
| 5,476,225 A | 12/1995 | Chan |
| D366,309 S | 1/1996 | Huang |
| D366,707 S | 1/1996 | Kaiser |
| D366,708 S | 1/1996 | Santarsiero |
| D366,709 S | 1/1996 | Szmanski |
| D366,710 S | 1/1996 | Szymanski |
| 5,481,765 A | 1/1996 | Wang |
| D366,948 S | 2/1996 | Carbone |
| D367,315 S | 2/1996 | Andrus |
| D367,333 S | 2/1996 | Swyst |
| D367,696 S | 3/1996 | Andrus |
| D367,934 S | 3/1996 | Carbone |
| D368,146 S | 3/1996 | Carbone |
| D368,317 S | 3/1996 | Swyst |
| 5,499,767 A | 3/1996 | Morand |
| D368,539 S | 4/1996 | Carbone et al. |
| D368,540 S | 4/1996 | Santarsiero |
| D368,541 S | 4/1996 | Kaiser et al. |
| D368,542 S | 4/1996 | deBlois et al. |
| D369,204 S | 4/1996 | Andrus |
| D369,205 S | 4/1996 | Andrus |
| 5,507,436 A | 4/1996 | Ruttenberg |
| D369,873 S | 5/1996 | deBlois et al. |
| D369,874 S | 5/1996 | Santarsiero |
| D369,875 S | 5/1996 | Carbone |
| D370,052 S | 5/1996 | Chan et al. |
| D370,250 S | 5/1996 | Fawcett et al. |
| D370,277 S | 5/1996 | Kaiser |
| D370,278 S | 5/1996 | Nolan |
| D370,279 S | 5/1996 | deBlois |
| D370,280 S | 5/1996 | Kaiser |
| D370,281 S | 5/1996 | Johnstone et al. |
| 5,517,392 A | 5/1996 | Rousso et al. |
| 5,521,803 A | 5/1996 | Eckert et al. |
| D370,542 S | 6/1996 | Santarsiero |
| D370,735 S | 6/1996 | deBlois |
| D370,987 S | 6/1996 | Santarsiero |
| D370,988 S | 6/1996 | Santarsiero |
| D371,448 S | 7/1996 | Santarsiero |
| D371,618 S | 7/1996 | Nolan |
| D371,619 S | 7/1996 | Szymanski |
| D371,856 S | 7/1996 | Carbone |

| Patent No. | Date | Name |
|---|---|---|
| D372,318 S | 7/1996 | Szymanski |
| D372,319 S | 7/1996 | Carbone |
| 5,531,625 A | 7/1996 | Zhong |
| 5,539,624 A | 7/1996 | Dougherty |
| D372,548 S | 8/1996 | Carbone |
| D372,998 S | 8/1996 | Carbone |
| D373,210 S | 8/1996 | Santarsiero |
| D373,434 S | 9/1996 | Nolan |
| D373,435 S | 9/1996 | Nolan |
| D373,645 S | 9/1996 | Johnstone et al. |
| D373,646 S | 9/1996 | Szymanski et al. |
| D373,647 S | 9/1996 | Kaiser |
| D373,648 S | 9/1996 | Kaiser |
| D373,649 S | 9/1996 | Carbone |
| D373,651 S | 9/1996 | Szymanski |
| D373,652 S | 9/1996 | Kaiser |
| 5,551,637 A | 9/1996 | Lo |
| 5,552,973 A | 9/1996 | Hsu |
| 5,558,278 A | 9/1996 | Gallorini |
| D374,271 S | 10/1996 | Fleischmann |
| D374,297 S | 10/1996 | Kaiser |
| D374,298 S | 10/1996 | Swyst |
| D374,299 S | 10/1996 | Carbone |
| D374,493 S | 10/1996 | Szymanski |
| D374,494 S | 10/1996 | Santarsiero |
| D374,732 S | 10/1996 | Kaiser |
| D374,733 S | 10/1996 | Santasiero |
| 5,560,548 A | 10/1996 | Mueller et al. |
| 5,567,115 A | 10/1996 | Carbone |
| D375,541 S | 11/1996 | Michaluk |
| 5,577,664 A | 11/1996 | Heitzman |
| D376,217 S | 12/1996 | Kaiser |
| D376,860 S | 12/1996 | Santarsiero |
| D376,861 S | 12/1996 | Johnstone et al. |
| D376,862 S | 12/1996 | Carbone |
| 5,605,173 A | 2/1997 | Arnaud |
| D378,401 S | 3/1997 | Neufeld et al. |
| 5,613,638 A | 3/1997 | Blessing |
| 5,613,639 A | 3/1997 | Storm et al. |
| 5,615,837 A | 4/1997 | Roman |
| 5,624,074 A | 4/1997 | Parisi |
| 5,624,498 A | 4/1997 | Lee et al. |
| D379,212 S | 5/1997 | Chan |
| D379,404 S | 5/1997 | Spelts |
| 5,632,049 A | 5/1997 | Chen |
| D381,405 S | 7/1997 | Waidele et al. |
| D381,737 S | 7/1997 | Chan |
| D382,936 S | 8/1997 | Shfaram |
| 5,653,260 A | 8/1997 | Huber |
| 5,667,146 A | 9/1997 | Pimentel et al. |
| D385,332 S | 10/1997 | Andrus |
| D385,333 S | 10/1997 | Caroen et al. |
| D385,334 S | 10/1997 | Caroen et al. |
| D385,616 S | 10/1997 | Dow et al. |
| D385,947 S | 11/1997 | Dow et al. |
| D387,230 S | 12/1997 | von Buelow et al. |
| 5,697,557 A | 12/1997 | Blessing et al. |
| 5,699,964 A | 12/1997 | Bergmann et al. |
| 5,702,057 A | 12/1997 | Huber |
| D389,558 S | 1/1998 | Andrus |
| 5,704,080 A | 1/1998 | Kuhne |
| 5,707,011 A | 1/1998 | Bosio |
| 5,718,380 A | 2/1998 | Schorn et al. |
| D392,369 S | 3/1998 | Chan |
| 5,730,361 A | 3/1998 | Thonnes |
| 5,730,362 A | 3/1998 | Cordes |
| 5,730,363 A | 3/1998 | Kress |
| 5,742,961 A | 4/1998 | Casperson et al. |
| D394,490 S | 5/1998 | Andrus et al. |
| 5,746,375 A | 5/1998 | Guo |
| 5,749,552 A | 5/1998 | Fan |
| 5,749,602 A | 5/1998 | Delaney et al. |
| D394,899 S | 6/1998 | Caroen et al. |
| D395,074 S | 6/1998 | Neibrook |
| D395,142 S | 6/1998 | Neibrook |
| 5,764,760 A | 6/1998 | Grandbert et al. |
| 5,765,760 A | 6/1998 | Kuo |
| 5,769,802 A | 6/1998 | Wang |
| 5,772,120 A | 6/1998 | Huber |
| 5,778,939 A | 7/1998 | Hok-Yin |
| 5,788,157 A | 8/1998 | Kress |
| D398,370 S | 9/1998 | Purdy |
| 5,806,771 A | 9/1998 | Loschelder et al. |
| 5,819,791 A | 10/1998 | Chronister et al. |
| 5,820,574 A | 10/1998 | Henkin et al. |
| 5,823,431 A | 10/1998 | Pierce |
| 5,823,442 A | 10/1998 | Guo |
| 5,826,803 A | 10/1998 | Cooper |
| 5,833,138 A | 11/1998 | Crane et al. |
| 5,839,666 A | 11/1998 | Heimann et al. |
| D402,350 S | 12/1998 | Andrus |
| D403,754 S | 1/1999 | Gottwald |
| D404,116 S | 1/1999 | Bosio |
| 5,855,348 A | 1/1999 | Fornara |
| 5,860,599 A | 1/1999 | Lin |
| 5,862,543 A | 1/1999 | Reynoso et al. |
| 5,862,985 A | 1/1999 | Neibrook et al. |
| D405,502 S | 2/1999 | Tse |
| 5,865,375 A | 2/1999 | Hsu |
| 5,865,378 A | 2/1999 | Hollinshead et al. |
| 5,873,647 A | 2/1999 | Kurtz et al. |
| D408,893 S | 4/1999 | Tse |
| D409,276 S | 5/1999 | Ratzlaff |
| D410,276 S | 5/1999 | Ben-Tsur |
| 5,918,809 A | 7/1999 | Simmons |
| 5,918,811 A | 7/1999 | Denham et al. |
| D413,157 S | 8/1999 | Ratzlaff |
| 5,937,905 A | 8/1999 | Santos |
| 5,938,123 A | 8/1999 | Heitzman |
| 5,941,462 A | 8/1999 | Sandor |
| 5,947,388 A | 9/1999 | Woodruff |
| D415,247 S | 10/1999 | Haverstraw et al. |
| 5,961,046 A | 10/1999 | Joubran |
| 5,967,417 A | 10/1999 | Mantel |
| 5,979,776 A | 11/1999 | Williams |
| 5,992,762 A | 11/1999 | Wang |
| D418,200 S | 12/1999 | Ben-Tsur |
| 5,997,047 A | 12/1999 | Pimentel et al. |
| 6,003,165 A | 12/1999 | Loyd |
| D418,902 S | 1/2000 | Haverstraw et al. |
| D418,903 S | 1/2000 | Haverstraw et al. |
| D418,904 S | 1/2000 | Milrud |
| D421,099 S | 2/2000 | Mullenmeister |
| 6,021,960 A | 2/2000 | Kehat |
| D422,053 S | 3/2000 | Brenner et al. |
| 6,042,027 A | 3/2000 | Sandvik |
| 6,042,155 A | 3/2000 | Lockwood |
| D422,336 S | 4/2000 | Haverstraw et al. |
| D422,337 S | 4/2000 | Chan |
| D423,083 S | 4/2000 | Haug et al. |
| D423,110 S | 4/2000 | Cipkowski |
| D424,160 S | 5/2000 | Haug et al. |
| D424,161 S | 5/2000 | Haug et al. |
| D424,162 S | 5/2000 | Haug et al. |
| D424,163 S | 5/2000 | Haug et al. |
| D426,290 S | 6/2000 | Haug et al. |
| D427,661 S | 7/2000 | Haverstraw et al. |
| D428,110 S | 7/2000 | Haug et al. |
| D428,125 S | 7/2000 | Chan |
| 6,085,780 A | 7/2000 | Morris |
| D430,267 S | 8/2000 | Milrud et al. |
| 6,095,801 A | 8/2000 | Spiewak |
| D430,643 S | 9/2000 | Tse |
| 6,113,002 A | 9/2000 | Finkbeiner |
| 6,123,272 A | 9/2000 | Havican et al. |
| 6,123,308 A | 9/2000 | Faisst |
| D432,624 S | 10/2000 | Chan |
| D432,625 S | 10/2000 | Chan |
| D433,096 S | 10/2000 | Tse |
| D433,097 S | 10/2000 | Tse |
| 6,126,091 A | 10/2000 | Heitzman |
| 6,126,290 A | 10/2000 | Veigel |
| D434,109 S | 11/2000 | Ko |
| 6,164,569 A | 12/2000 | Hollinshead et al. |
| 6,164,570 A | 12/2000 | Smeltzer |
| D435,889 S | 1/2001 | Ben-Tsur et al. |
| D439,305 S | 3/2001 | Slothower |
| 6,199,580 B1 | 3/2001 | Morris |

| | | |
|---|---|---|
| 6,202,679 B1 | 3/2001 | Titus |
| D440,276 S | 4/2001 | Slothower |
| D440,277 S | 4/2001 | Slothower |
| D440,278 S | 4/2001 | Slothower |
| D441,059 S | 4/2001 | Fleischmann |
| 6,209,799 B1 | 4/2001 | Finkbeiner |
| D443,025 S | 5/2001 | Kollmann et al. |
| D443,026 S | 5/2001 | Kollmann et al. |
| D443,027 S | 5/2001 | Kollmann et al. |
| D443,029 S | 5/2001 | Kollmann et al. |
| 6,223,998 B1 | 5/2001 | Heitzman |
| 6,230,984 B1 | 5/2001 | Jager |
| 6,230,988 B1 | 5/2001 | Chao et al. |
| 6,230,989 B1 | 5/2001 | Haverstraw et al. |
| D443,335 S | 6/2001 | Andrus |
| D443,336 S | 6/2001 | Kollmann et al. |
| D443,347 S | 6/2001 | Gottwald |
| 6,241,166 B1 | 6/2001 | Overington et al. |
| 6,250,572 B1 | 6/2001 | Chen |
| D444,865 S | 7/2001 | Gottwald |
| D445,871 S | 7/2001 | Fan |
| 6,254,014 B1 | 7/2001 | Clearman et al. |
| 6,270,278 B1 | 8/2001 | Mauro |
| 6,276,004 B1 | 8/2001 | Bertrand et al. |
| 6,283,447 B1 | 9/2001 | Fleet |
| 6,286,764 B1 | 9/2001 | Garvey et al. |
| D449,673 S | 10/2001 | Kollmann et al. |
| D450,370 S | 11/2001 | Wales et al. |
| D450,805 S | 11/2001 | Lindholm et al. |
| D450,806 S | 11/2001 | Lindholm et al. |
| D450,807 S | 11/2001 | Lindholm et al. |
| D451,169 S | 11/2001 | Lindholm et al. |
| D451,170 S | 11/2001 | Lindholm et al. |
| D451,171 S | 11/2001 | Lindholm et al. |
| D451,172 S | 11/2001 | Lindholm et al. |
| 6,321,777 B1 | 11/2001 | Wu |
| 6,322,006 B1 | 11/2001 | Guo |
| D451,583 S | 12/2001 | Lindholm et al. |
| D451,980 S | 12/2001 | Lindholm et al. |
| D452,553 S | 12/2001 | Lindholm et al. |
| D452,725 S | 1/2002 | Lindholm et al. |
| D452,897 S | 1/2002 | Gillette et al. |
| 6,336,764 B1 | 1/2002 | Liu |
| D453,369 S | 2/2002 | Lobermeier |
| D453,370 S | 2/2002 | Lindholm et al. |
| D453,551 S | 2/2002 | Lindholm et al. |
| 6,349,735 B2 | 2/2002 | Gul |
| D454,617 S | 3/2002 | Curbbun et al. |
| D454,938 S | 3/2002 | Lord |
| 6,375,342 B1 | 4/2002 | Koren et al. |
| D457,937 S | 5/2002 | Lindholm et al. |
| 6,382,531 B1 | 5/2002 | Tracy |
| D458,348 S | 6/2002 | Mullenmeister |
| 6,412,711 B1 | 7/2002 | Fan |
| D461,224 S | 8/2002 | Lobermeier |
| D461,878 S | 8/2002 | Green et al. |
| 6,450,425 B1 | 9/2002 | Chen |
| 6,454,186 B2 | 9/2002 | Haverstraw et al. |
| 6,463,658 B1 | 10/2002 | Larsson |
| 6,464,265 B1 | 10/2002 | Mikol |
| D465,552 S | 11/2002 | Tse |
| D465,553 S | 11/2002 | Singtoroj |
| 6,484,952 B2 | 11/2002 | Koren |
| D468,800 S | 1/2003 | Tse |
| D469,165 S | 1/2003 | Lim |
| 6,502,796 B1 | 1/2003 | Wales |
| 6,508,415 B2 | 1/2003 | Wang |
| 6,511,001 B1 | 1/2003 | Huang |
| D470,219 S | 2/2003 | Schweitzer |
| 6,516,070 B2 | 2/2003 | Macey |
| D471,253 S | 3/2003 | Tse |
| D471,953 S | 3/2003 | Colligan et al. |
| 6,533,194 B2 | 3/2003 | Marsh et al. |
| 6,537,455 B2 | 3/2003 | Farley |
| D472,958 S | 4/2003 | Ouyoung |
| 6,550,697 B2 | 4/2003 | Lai |
| 6,585,174 B1 | 7/2003 | Huang |
| 6,595,439 B1 | 7/2003 | Chen |
| 6,607,148 B1 | 8/2003 | Marsh et al. |
| 6,611,971 B1 | 9/2003 | Antoniello et al. |
| 6,637,676 B2 | 10/2003 | Zieger et al. |
| 6,641,057 B2 | 11/2003 | Thomas et al. |
| D483,837 S | 12/2003 | Fan |
| 6,659,117 B2 | 12/2003 | Gilmore |
| 6,659,372 B2 | 12/2003 | Marsh et al. |
| D485,887 S | 1/2004 | Luettgen et al. |
| D486,888 S | 2/2004 | Lobermeier |
| 6,691,338 B2 | 2/2004 | Zieger |
| 6,691,933 B1 | 2/2004 | Bosio |
| D487,301 S | 3/2004 | Haug et al. |
| D487,498 S | 3/2004 | Blomstrom |
| 6,701,953 B2 | 3/2004 | Agosta |
| 6,715,699 B1 | 4/2004 | Greenberg et al. |
| 6,719,218 B2 | 4/2004 | Cool et al. |
| D489,798 S | 5/2004 | Hunt |
| D490,498 S | 5/2004 | Golichowski |
| 6,736,336 B2 | 5/2004 | Wong |
| 6,739,523 B2 | 5/2004 | Haverstraw et al. |
| 6,739,527 B1 | 5/2004 | Chung |
| D492,004 S | 6/2004 | Haug et al. |
| D492,007 S | 6/2004 | Kollmann et al. |
| 6,742,725 B1 | 6/2004 | Fan |
| D493,208 S | 7/2004 | Lin |
| D493,864 S | 8/2004 | Haug et al. |
| D494,655 S | 8/2004 | Lin |
| D494,661 S | 8/2004 | Zieger et al. |
| D495,027 S | 8/2004 | Mazzola |
| 6,776,357 B1 | 8/2004 | Naito |
| 6,789,751 B1 | 9/2004 | Fan |
| D496,987 S | 10/2004 | Glunk |
| D497,974 S | 11/2004 | Haug et al. |
| D498,514 S | 11/2004 | Haug et al. |
| D500,121 S | 12/2004 | Blomstrom |
| D500,549 S | 1/2005 | Blomstrom |
| D501,242 S | 1/2005 | Blomstrom |
| D502,760 S | 3/2005 | Zieger et al. |
| D502,761 S | 3/2005 | Zieger et al. |
| D503,211 S | 3/2005 | Lin |
| 6,863,227 B2 | 3/2005 | Wollenberg et al. |
| 6,869,030 B2 | 3/2005 | Blessing et al. |
| D503,774 S | 4/2005 | Zieger |
| D503,775 S | 4/2005 | Zieger |
| D503,966 S | 4/2005 | Zieger |
| 6,899,292 B2 | 5/2005 | Titinet |
| D506,243 S | 6/2005 | Wu |
| D507,037 S | 7/2005 | Wu |
| 6,935,581 B2 | 8/2005 | Titinet |
| D509,280 S | 9/2005 | Bailey et al. |
| D509,563 S | 9/2005 | Bailey et al. |
| D510,123 S | 9/2005 | Tsai |
| D511,809 S | 11/2005 | Haug et al. |
| D512,119 S | 11/2005 | Haug et al. |
| 6,981,661 B1 | 1/2006 | Chen |
| D516,169 S | 2/2006 | Wu |
| 7,000,854 B2 | 2/2006 | Malek et al. |
| 7,004,409 B2 | 2/2006 | Okubo |
| 7,004,410 B2 | 2/2006 | Li |
| D520,109 S | 5/2006 | Wu |
| 7,040,554 B2 | 5/2006 | Drennow |
| 7,048,210 B2 | 5/2006 | Clark |
| 7,055,767 B2 | 6/2006 | Ko |
| 7,070,125 B2 | 7/2006 | Williams et al. |
| 7,077,342 B2 | 7/2006 | Lee |
| D527,440 S | 8/2006 | Macan |
| 7,093,780 B1 | 8/2006 | Chung |
| 7,097,122 B2 | 8/2006 | Farley |
| D528,631 S | 9/2006 | Gillette et al. |
| 7,100,845 B1 | 9/2006 | Hsieh |
| 7,111,795 B2 | 9/2006 | Thong |
| 7,111,798 B2 | 9/2006 | Thomas et al. |
| D530,389 S | 10/2006 | Glenslak et al. |
| D530,392 S | 10/2006 | Tse |
| D531,259 S | 10/2006 | Hsieh |
| 7,114,666 B2 | 10/2006 | Luettgen et al. |
| D533,253 S | 12/2006 | Luettgen et al. |
| D534,239 S | 12/2006 | Dingler et al. |
| D535,354 S | 1/2007 | Wu |
| D536,060 S | 1/2007 | Sadler |

| | | | | | | |
|---|---|---|---|---|---|---|
| 7,156,325 | B1 | 1/2007 | Chen | 2008/0121293 A1 | 5/2008 | Leber |
| D538,391 | S | 3/2007 | Mazzola | 2008/0156897 A1 | 7/2008 | Leber |
| D540,424 | S | 4/2007 | Kirar | 2008/0156902 A1 | 7/2008 | Luettgen et al. |
| D540,425 | S | 4/2007 | Endo et al. | 2008/0156903 A1 | 7/2008 | Leber |
| D540,426 | S | 4/2007 | Cropelli | 2008/0223957 A1 | 9/2008 | Schorn |
| D540,427 | S | 4/2007 | Bouroullec et al. | 2008/0272203 A1 | 11/2008 | Leber |
| D542,391 | S | 5/2007 | Gilbert | 2009/0200404 A1 | 8/2009 | Cristina |
| D542,393 | S | 5/2007 | Haug et al. | 2009/0218420 A1 | 9/2009 | Mazzola |
| 7,229,031 | B2 | 6/2007 | Schmidt | 2009/0307836 A1 | 12/2009 | Blattner et al. |
| 7,243,863 | B2 | 7/2007 | Glunk | 2010/0320290 A1 | 12/2010 | Luettgen et al. |
| 7,246,760 | B2 | 7/2007 | Marty et al. | 2011/0000982 A1 | 1/2011 | Luettgen et al. |
| D552,713 | S | 10/2007 | Rexach | 2011/0000983 A1 | 1/2011 | Chang |
| 7,278,591 | B2 | 10/2007 | Clearman et al. | 2011/0011953 A1 | 1/2011 | Macan et al. |
| D556,295 | S | 11/2007 | Genord et al. | | | |
| 7,299,510 | B2 | 11/2007 | Tsai | | | |
| D557,763 | S | 12/2007 | Schonherr et al. | FOREIGN PATENT DOCUMENTS | | |
| D557,764 | S | 12/2007 | Schonherr et al. | | | |
| D557,765 | S | 12/2007 | Schonherr et al. | CH | 234284 | 3/1963 |
| D558,301 | S | 12/2007 | Hoernig | DE | 352813 | 5/1922 |
| 7,303,151 | B2 | 12/2007 | Wu | DE | 848627 | 9/1952 |
| D559,357 | S | 1/2008 | Wang et al. | DE | 854100 | 10/1952 |
| D559,945 | S | 1/2008 | Patterson et al. | DE | 2360534 | 6/1974 |
| D560,269 | S | 1/2008 | Tse | DE | 2806093 | 8/1979 |
| D562,937 | S | 2/2008 | Schonherr et al. | DE | 3107808 | 9/1982 |
| D562,938 | S | 2/2008 | Blessing | DE | 3246327 | 6/1984 |
| D562,941 | S | 2/2008 | Pan | DE | 3440901 | 7/1985 |
| 7,331,536 | B1 | 2/2008 | Zhen et al. | DE | 3706320 | 3/1988 |
| 7,347,388 | B2 | 3/2008 | Chung | DE | 8804236 | 6/1988 |
| D565,699 | S | 4/2008 | Berberet | DE | 4034695 | 5/1991 |
| D565,703 | S | 4/2008 | Lammel et al. | DE | 19608085 | 9/1996 |
| D566,228 | S | 4/2008 | Neagoe | DE | 202005000881 | 3/2005 |
| D566,229 | S | 4/2008 | Rexach | DE | 102006032017 | 1/2008 |
| D567,328 | S | 4/2008 | Spangler et al. | EP | 0167063 | 6/1985 |
| 7,360,723 | B2 | 4/2008 | Lev | EP | 0478999 | 4/1992 |
| 7,364,097 | B2 | 4/2008 | Okuma | EP | 0514753 | 11/1992 |
| 7,374,112 | B1 | 5/2008 | Bulan et al. | EP | 0435030 | 7/1993 |
| 7,384,007 | B2 | 6/2008 | Ho | EP | 0617644 | 10/1994 |
| D577,099 | S | 9/2008 | Leber | EP | 0683354 | 11/1995 |
| D577,793 | S | 9/2008 | Leber | EP | 0687851 | 12/1995 |
| D580,012 | S | 11/2008 | Quinn et al. | EP | 0695907 | 2/1996 |
| D580,513 | S | 11/2008 | Quinn et al. | EP | 0700729 | 3/1996 |
| D581,014 | S | 11/2008 | Quinn et al. | EP | 0719588 | 7/1996 |
| 7,503,345 | B2 | 3/2009 | Paterson et al. | EP | 0721082 | 7/1996 |
| 7,520,448 | S | 4/2009 | Luettgen et al. | EP | 0733747 | 9/1996 |
| 7,537,175 | B2 | 5/2009 | Miura et al. | EP | 0808661 | 11/1997 |
| D608,412 | S | 1/2010 | Barnard et al. | EP | 0726811 | 1/1998 |
| D608,413 | S | 1/2010 | Barnard et al. | EP | 2164642 | 10/2010 |
| D616,061 | S | 5/2010 | Whitaker et al. | EP | 2260945 | 12/2010 |
| D621,904 | S | 8/2010 | Yoo et al. | FR | 538538 | 6/1922 |
| D621,905 | S | 8/2010 | Yoo et al. | FR | 873808 | 7/1942 |
| 7,832,662 | B2 | 11/2010 | Gallo | FR | 1039750 | 10/1953 |
| D628,676 | S | 12/2010 | Lee | FR | 1098836 | 8/1955 |
| D629,867 | S | 12/2010 | Rexach et al. | FR | 2596492 | 10/1987 |
| 2002/0109023 | A1 | 8/2002 | Thomas et al. | FR | 2695452 | 3/1994 |
| 2003/0062426 | A1 | 4/2003 | Gregory et al. | GB | 3314 | 0/1914 |
| 2004/0074993 | A1 | 4/2004 | Thomas et al. | GB | 10086 | 0/1894 |
| 2004/0118949 | A1 | 6/2004 | Marks | GB | 129812 | 7/1919 |
| 2004/0217209 | A1 | 11/2004 | Bui | GB | 204600 | 10/1923 |
| 2004/0244105 | A1 | 12/2004 | Tsai | GB | 634483 | 3/1950 |
| 2005/0001072 | A1 | 1/2005 | Bolus et al. | GB | 971866 | 10/1964 |
| 2005/0082824 | A1 | 4/2005 | Luettgen et al. | GB | 1111126 | 4/1968 |
| 2005/0284967 | A1 | 12/2005 | Korb | GB | 2066074 | 1/1980 |
| 2006/0016908 | A1 | 1/2006 | Chung | GB | 2066704 | 7/1981 |
| 2006/0016913 | A1 | 1/2006 | Lo | GB | 2068778 | 8/1981 |
| 2006/0043214 | A1 | 3/2006 | Macan et al. | GB | 2121319 | 12/1983 |
| 2006/0060678 | A1 | 3/2006 | Mazzola | GB | 2155984 | 10/1985 |
| 2006/0102747 | A1 | 5/2006 | Ho | GB | 2156932 A | 10/1985 |
| 2006/0157590 | A1 | 7/2006 | Clearman et al. | GB | 2199771 | 7/1988 |
| 2006/0163391 | A1 | 7/2006 | Schorn | GB | 2298595 | 11/1996 |
| 2006/0219822 | A1 | 10/2006 | Miller et al. | GB | 2337471 | 11/1999 |
| 2006/0283986 | A1 | 12/2006 | Chung | IT | 327400 | 7/1935 |
| 2007/0040054 | A1 | 2/2007 | Farzan | IT | 350359 | 7/1937 |
| 2007/0200013 | A1 | 8/2007 | Hsiao | IT | 563459 | 5/1957 |
| 2007/0246577 | A1 | 10/2007 | Leber | JP | S63-181459 | 11/1988 |
| 2007/0252021 | A1 | 11/2007 | Cristina | JP | H2-78660 | 6/1990 |
| 2007/0272770 | A1 | 11/2007 | Leber et al. | JP | 4062238 | 2/1992 |
| 2008/0073449 | A1 | 3/2008 | Haynes et al. | JP | 4146708 | 5/1992 |
| 2008/0083844 | A1 | 4/2008 | Leber et al. | NL | 8902957 | 6/1991 |
| 2008/0111004 | A1 | 5/2008 | Huffman | WO | WO93/12894 | 7/1993 |

| | | |
|---|---|---|
| WO | WO93/25839 | 12/1993 |
| WO | WO96/00617 | 1/1996 |
| WO | WO98/30336 | 7/1998 |
| WO | WO99/59726 | 11/1999 |
| WO | WO00/10720 | 3/2000 |
| WO | WO2010/04593 | 1/2010 |

OTHER PUBLICATIONS

Color Copy, Labeled 1B, Gemlo, available at least as early as Dec. 2, 1998.

Author Unknown, "Flipside: The Bolder Look of Kohler," 1 page, at least as early as Jun. 2011.

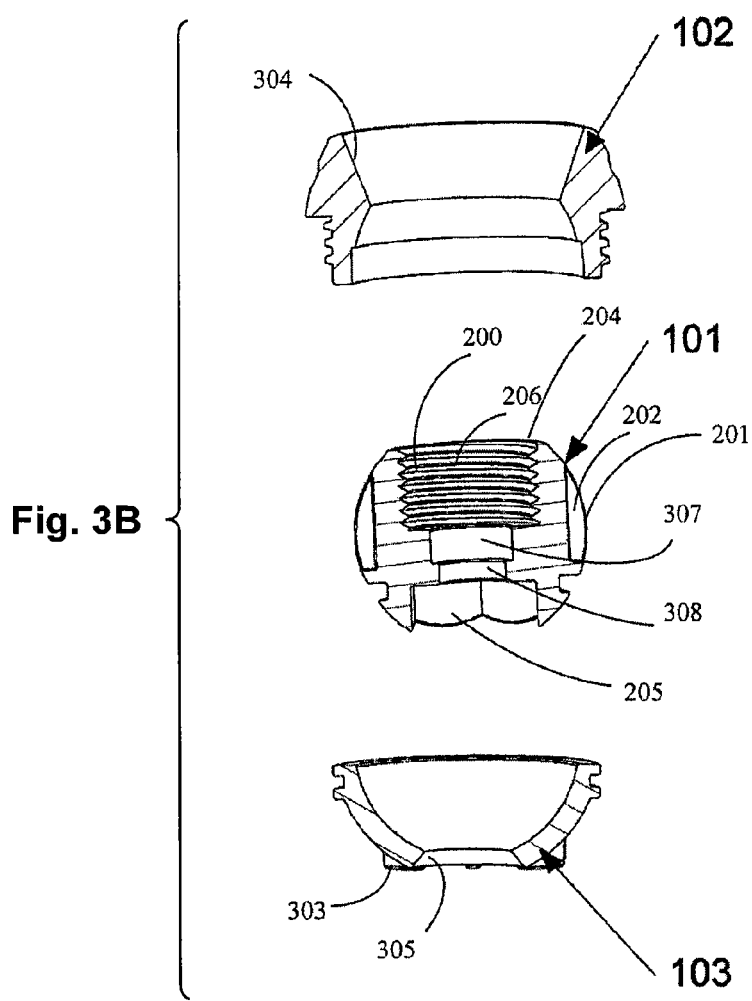

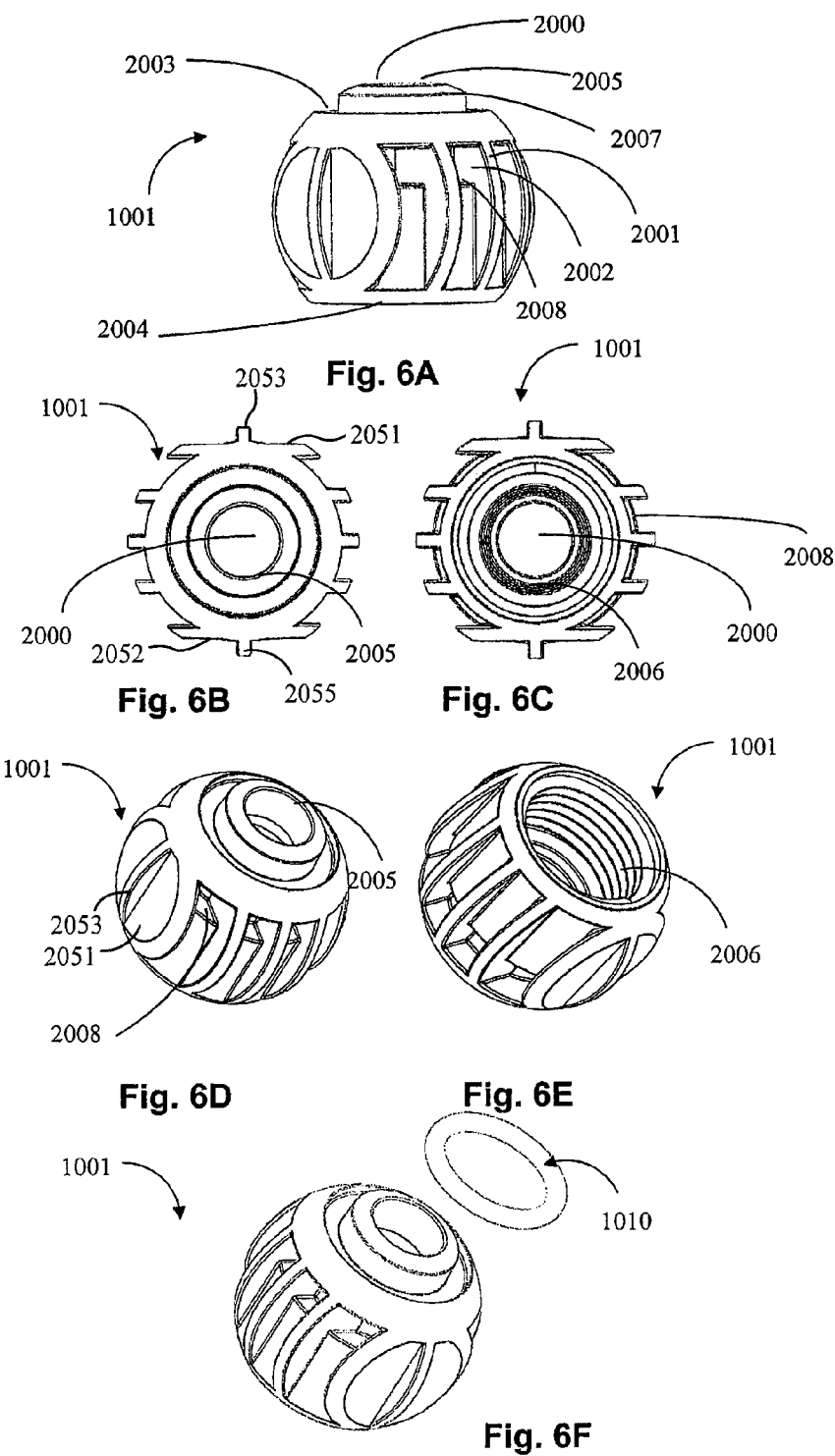

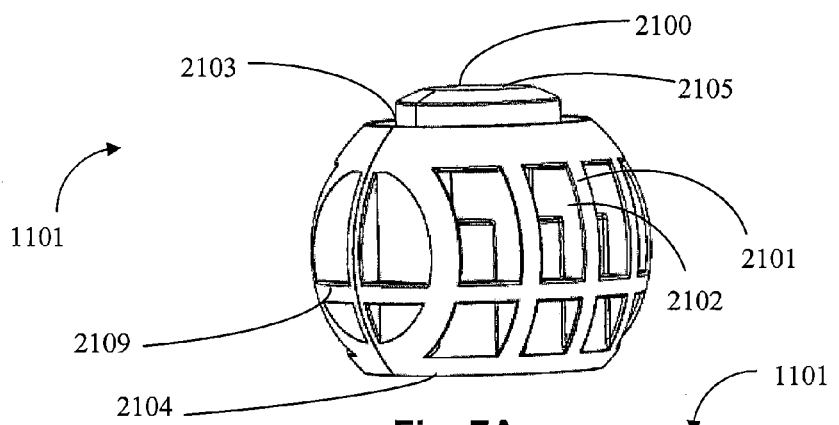
Fig. 7A
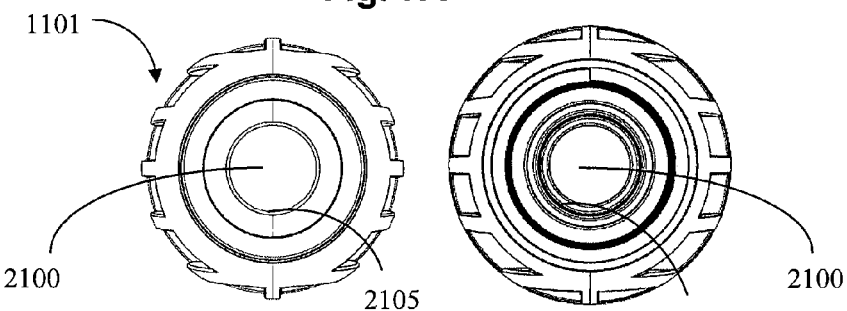
Fig. 7B  Fig. 7C
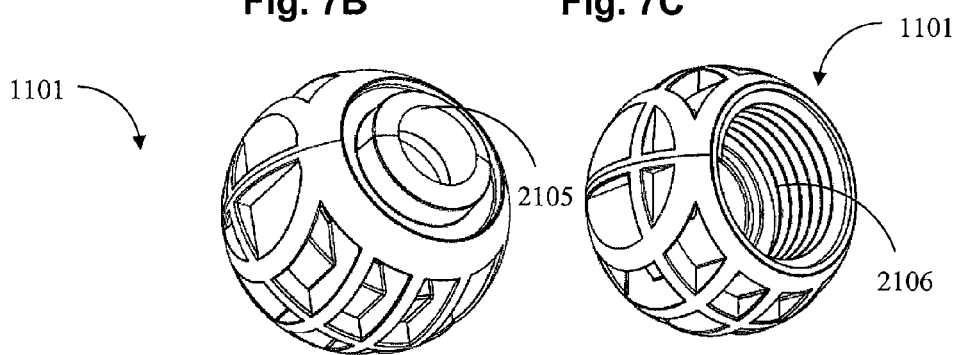
Fig. 7D  Fig. 7E
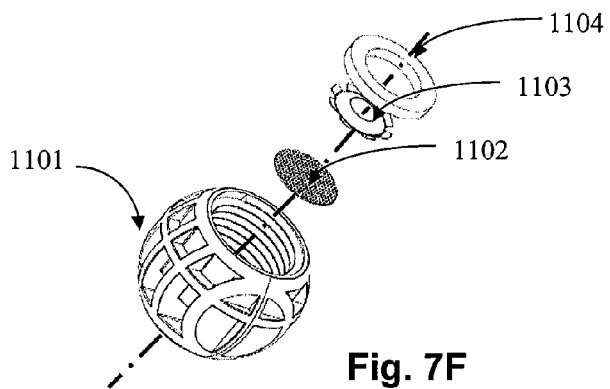
Fig. 7F

HIDDEN PIVOT ATTACHMENT FOR SHOWERS AND METHOD OF MAKING SAME

CROSS-REFERENCE TO RELATED APPLICATIONS

This application claims the benefit under 35 U.S.C. §119 (e) of provisional patent application No. 60/916,219, filed May 4, 2007 and entitled "Hidden Pivot Attachment for Showers and Method of Making Same"; provisional patent application No. 60/916,092, filed May 4, 2007 and entitled "Molded Arm for Showerheads and Method of Making Same"; and provisional patent application No. 60/916,146, filed May 4, 2007 and entitled "Low Flow Showerhead and Method of Making Same"; the contents of each of which are incorporated herein by reference in their entireties.

INCORPORATION BY REFERENCE

This application is also related to copending patent application No. 12/112,697, entitled "Molded Arm for Showerheads and Method of Making Same," and copending Patent Application No. 12/114,304 entitled "Low Flow Showerhead And Method Of Making Same," the entire disclosures of which are incorporated herein by reference.

This application hereby incorporates by reference herein U.S. Pat. No. 6,626,210 in its entirety.

FIELD OF THE INVENTION

Aspects of the present invention relate to a hidden pivot attachment for use in shower assemblies. More particularly, the present invention, in certain aspects, provides a hidden pivot attachment for a pivotal shower assembly fabricated from high-strength materials, which is attachable to a water supply.

BACKGROUND OF THE INVENTION

Showerheads and other shower assemblies having various configurations typically attach to a water pipe, e.g. a j-pipe, by a cylinder having internal threading that is complementary to external threading of a water pipe. The assemblies typically will also include a pivot ball that is coupled to the non-attachment end of the attachment cylinder. Once the cylinder is attached to the water pipe, the cylinder and some of the pipe threading are visible to the user. Problems can result from such an assembly, as the cylinder and exposed pipe threading may be difficult to clean. In addition, when a cylinder assembly is a unitary structure, e.g., a pivot ball and cylinder attached to the outside of the pivot ball, the structure typically requires cosmetic treatment, e.g., electroplating or powder coating, in order for the showerhead attachment to appear pleasing to the user. As a result, the materials that may be selected to fabricate the cylinder assembly are limited.

Accordingly, there is a need to provide a showerhead and other shower assemblies with an attachment that is hidden within the assembly. In addition, there is a need for a showerhead assembly that covers or at least obscures external pipe threading on water pipes. Further, there is a need for a showerhead assembly that is easy to clean.

SUMMARY OF THE INVENTION

Various embodiments of the invention address the issues described above by providing a hidden pivot attachment for attaching to water supplies that is usable in various shower assemblies. When housed in various shower assemblies, each of the hidden pivot attachment, any visible external threading on the water supply, and in some instances, a portion of the water supply that is not threaded are substantially hidden from view. Providing a hidden pivot attachment that is substantially hidden during use enables the pivotal attachment to be fabricated from various high-strength materials that do not require cosmetic treatment. In addition, the overall design of shower assemblies incorporating the hidden pivot attachment therein may be modified in order to provide shower assemblies that are easily cleaned.

According to one configuration, a water supply attachment is a spherically-shaped pivot attachment having a hollow passage extending between opposing ends. The hollow passage includes at least a threaded portion for coupling to water supplies and extends from one of the hollow passage opposing ends into the hollow passage.

In another configuration, an assembly for showers having a hidden pivot attachment includes a spherically-shaped pivot attachment; a nozzle plate cover having a threaded portion; and an attachment nut having a threaded portion, the threaded portion having threading that is complementary to the nozzle plate threaded portion; where when the assembly is coupled to a water supply, the spherically-shaped pivot attachment is coupled to a water supply pipe, the attachment nut and the nozzle plate enclose the spherically-shaped pivot attachment in a chamber-like interior having opposing opened ends, and where the opposing opened ends are configured to allow the spherically-shaped pivot attachment to attach to the water supply and allow water supply egress.

In one implementation, a method for making a water supply attachment includes forming a spherically-shaped pivot attachment having a hollow passage extending between opposing ends, where the hollow passage includes at least a threaded portion for coupling to water supplies, where the threaded portion extends from one of the hollow passage opposing ends into the hollow passage.

These and other features and advantages of aspects of the present invention will become apparent to those skilled in the art from the following detailed description, where it is shown and described illustrative embodiments, including best modes contemplated for carrying out the invention. As it will be realized, the various aspects of the invention are capable of modifications in various obvious respects, all without departing from the spirit and scope of the present invention. Accordingly, the drawings and detailed description are to be regarded as illustrative in nature and not restrictive.

DESCRIPTION OF THE DRAWINGS

FIG. 3b is an exploded cross-sectional view of an attachment nut, seal cup and hidden pivot attachment.

FIGS. 6A-F depict various views of another hidden pivot attachment.

FIGS. 7A-F depict various views of yet another hidden pivot attachment.

DETAILED DESCRIPTION OF THE INVENTION

Certain embodiments of the invention provide a hidden pivot attachment for use with shower assemblies such as mounted showerheads, shower brackets for hand showers, diverter valves, shower arms and shower combinations. The various aspects of the present invention are described below with reference to the figures.

Figure 1A:
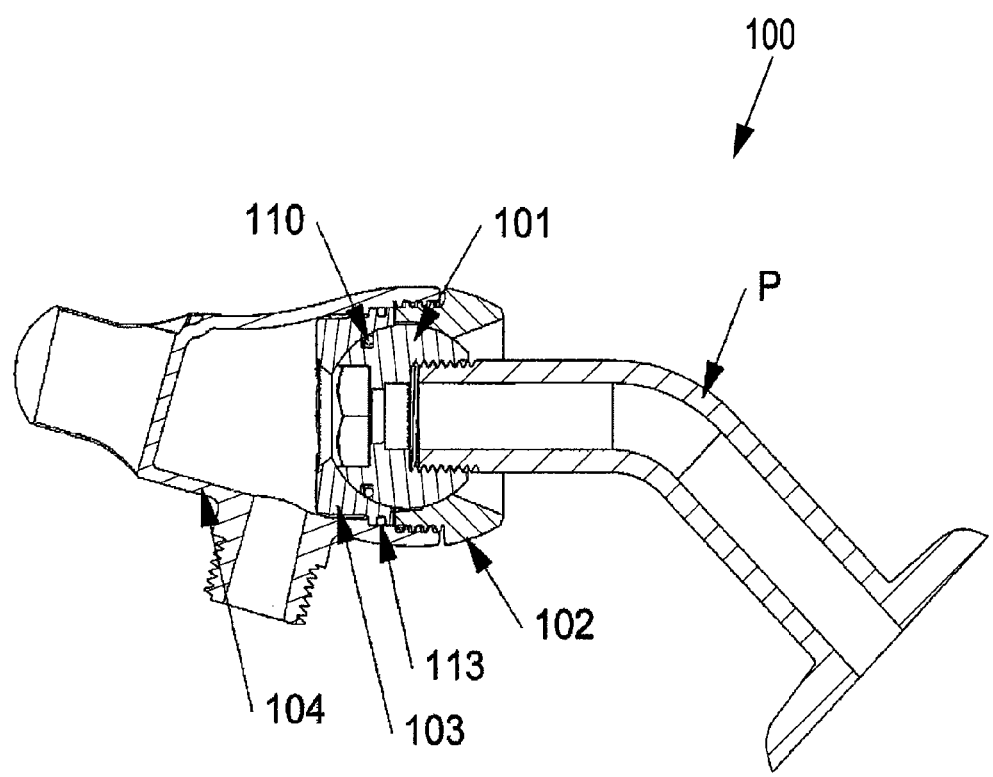
FIG. 1A depicts a cross-sectional view of a shower bracket for a hand shower with a hidden pivot attachment.

FIG. 1A provides a cross-sectional illustration of an exemplary shower bracket assembly 100 for a hand shower assembly that includes a hidden pivot attachment 101 for attaching to pipe P, e.g., a water pipe such as a threaded j-pipe or another fluid supply structure. The hidden pivot attachment 101 includes an attachment feature that enables the hidden pivot attachment 101 to be coupled to pipe P, and a passageway that provides open fluid communication with the shower bracket assembly. Hidden pivot attachment 101 allows angular adjustment of the shower bracket assembly, e.g., rotational and/or pivotal adjustment. Further aspects of hidden pivot attachment 101 are described in detail below.

The shower bracket assembly is coupled to hidden pivot attachment 101 via attachment nut 102, which is a collar-shaped structure having opened ends and external threading. Attachment nut 102 serves to enclose a portion of the hidden pivot attachment 101, extend over a portion of the end of pipe P and to engage with the internal threading of the shower bracket assembly via the complementary external threading. Attachment nut 102, at one end, includes an open circumference with a cup-like recess sized and shaped to accommodate a first part of the hidden pivot attachment 101, e.g. about half of the hidden pivot attachment 101. At an opposite end, attachment nut 102 has an open circumference sized to enable a portion of the first part of the hidden pivot attachment 101 to protrude from an interior of the attachment nut 102, thus allowing hidden pivot attachment 101 to couple to pipe P.

Arranged in the interior of shower bracket assembly is seal cup 103, another cup-shaped structure having opened ends. The cup-shaped portion of seal cup 103 serves as a receiver for hidden pivot attachment 101. At one end, seal cup 103 has an opened circumference sized for receiving another part of the hidden pivot attachment 101, e.g., the balance of the hidden pivot attachment 101 that is not accommodated by attachment nut 102. At its opposite end, e.g., at the trough of the cup, seal cup 103 has an opened circumference sized for allowing water to exit from it. In addition, seal cup 103 includes a recessed external circumferential area for accommodating an o-ring 113.

The majority of the visible portion of the shower bracket assembly is formed of bracket housing 104. Bracket housing is arranged such that it is adjacent to seal cup 103, and in its interior, is sized to accommodate seal cup 103, a portion of hidden pivot attachment 101 and the threaded portion of attachment nut 102. Bracket housing 104 includes internal threading complementary to the external threading of attachment nut 102 so that bracket housing 104 and attachment nut 102 may be coupled, and hidden pivot attachment 101 and seal cup 103 secured within.

In addition, FIG. 1A includes o-ring 110 coupled to a recessed circumferential area of hidden pivot attachment 101 such that it runs transversely to the ribs, and o-ring 113 arranged in a recessed circumferential area of seal cup 103. O-rings 110 and 113 can provide water tight sealing so that all water from pipe P exits the water egress of bracket housing 104. For example, hidden pivot attachment 101 with o-ring 110 attached can form a sliding seal with seal cup 103, and seal cup 103 with o-ring 113 can form a seal with bracket housing 104. In addition, o-rings, such as o-ring 110, may facilitate holding the shower assembly in place in relation to the hidden pivot attachment 101 once a position has been selected by a user.

Figure 1B:
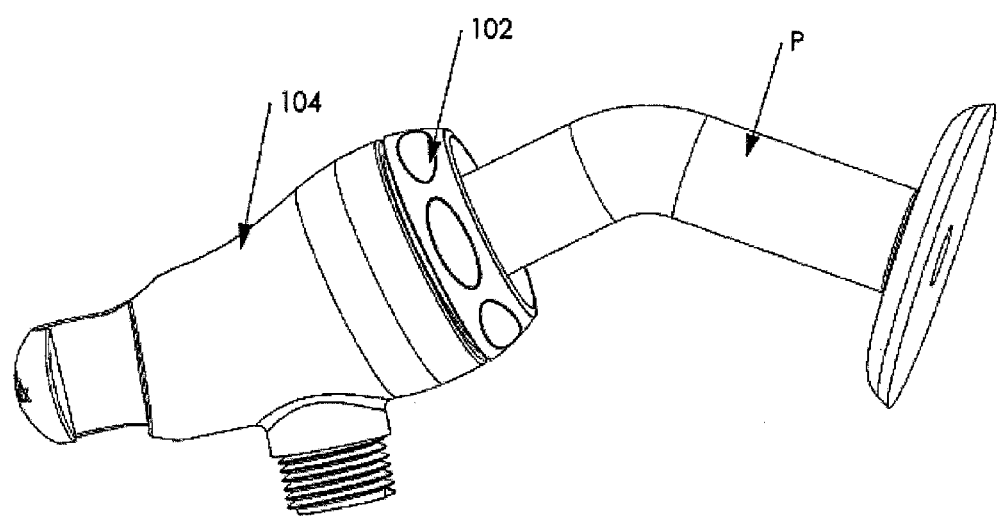
FIG. 1B depicts a side-view of a shower bracket for a hand shower with a hidden pivot attachment inside.

FIG. 1B is an illustration of a side-view of the substantially visible portions of the shower bracket assembly described in FIG. 1A.

In order to connect the shower bracket assembly to a water source, attachment nut 102 may be slid over pipe P and hidden pivot attachment 101 may then be coupled to pipe P. In this way, hidden pivot attachment 101 retains attachment nut 102 on pipe P. After hidden pivot attachment 101 is secured to pipe P, the seal cup 103 and bracket housing 104 together are brought near or into contact with hidden pivot attachment 101. Attachment nut 102 may then be slid down pipe P to hidden pivot attachment 101 so that the external threading of attachment nut 102 contacts the internal threading bracket housing 104. The attachment nut 102 can be rotated into the bracket housing 104, while the rest of the assembly remains stationary. The attachment nut 102 may be configured so that it can be tightened to bracket housing 104 sufficiently to hold the bracket assembly in a desired position. As the attachment nut 102 and bracket housing 104 are tightened, any o-rings provided in the assembly may form a seal with its opposing surfaces, e.g., o-ring 110 may couple to the opposing surfaces on seal cup 103 and in the internal recess of hidden pivot attachment 101. The attachment nut 102 and/or the bracket housing 104 may also be loosened to enable the bracket assembly to be repositioned, and then retightened to hold the bracket assembly in its adjusted position.

Upon assembly, the attachment nut 102 and bracket housing 104 are visible, and hidden pivot attachment 101 and seal cup 103 (not shown) are housed within the assembled shower bracket. According to this embodiment, due to the hidden pivot attachment 101 being attached to the water source separately from the other portions of the assembly, the orientation of the bracket housing 104 with respect to the water source can be selected without concern for whether the entire assembly needs adjusting in order to adequately couple to the water source.

Figure 1C:
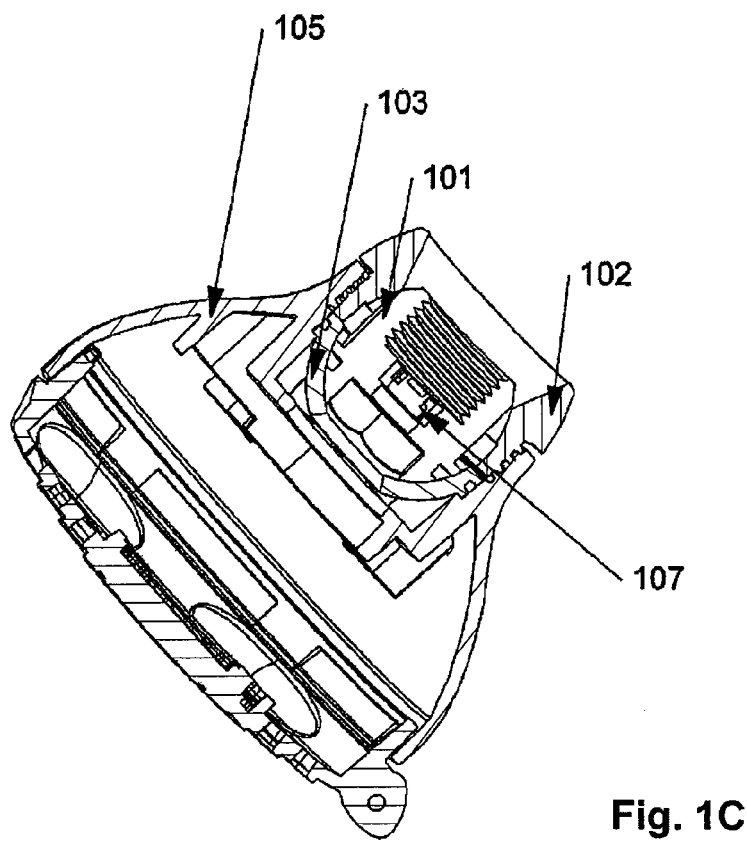
FIG. 1C depicts a cross-sectional view of a showerhead with a hidden pivot attachment.

FIG. 1C provides an exemplary cross-sectional view of a showerhead that includes hidden pivot attachment 101. The showerhead of FIG. 1C includes similar structures to the shower bracket assembly described in FIG. 1A above, except that nozzle plate cover 105 is provided that includes internal threading complementary to the threading of attachment nut 102. In addition, FIG. 1C includes flow regulator 107 arranged in the hollow passage of the hidden pivot attachment 101 in an area between a threaded portion and a water egress portion, which can be a 1-5 gallon flow regulator, for example. Similar to the shower bracket assembly, the visible portions of the assembled showerhead are nozzle plate cover 105 and attachment nut 102, while the hidden pivot attachment 101, seal cup 103 and flow regulator 107 are housed within the assembled showerhead. In addition, the showerhead assembly may be connected to a water source in the same way as the shower bracket assembly.

As a result of the hidden pivot attachment 101 being substantially invisible after the shower bracket is assembled, hidden pivot attachment 101 can have various shapes and sizes, and can be fabricated using a variety of high-strength materials, such as composite plastics. In addition, it is unnecessary for the hidden pivot attachment 101 to receive cosmetic treatment.

Figure 2A:
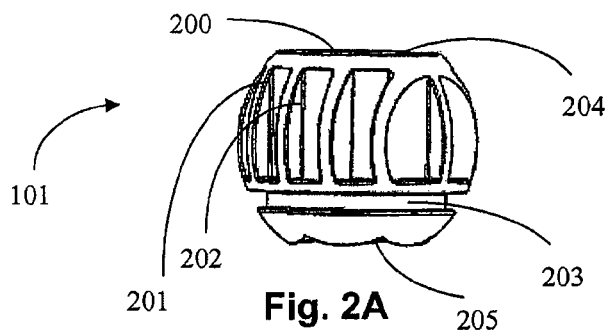
FIGS. 2A-F depict various views of a hidden pivot attachment.

FIGS. 2A-2F provide various views of an exemplary hidden pivot attachment 101 according to the invention. FIG. 2A depicts a side-view of hidden pivot attachment 101 showing a cylindrical pivot ball having an internal hollow passage 200 and external ribs 201 separated by parallel recesses 202 around its circumference, a circumferential recess 203 for accommodating an o-ring, a first opened end 204 that is planar, and an opposite opened end 205 that is shaped like a hexagon so that the opened end has a scalloped shape around the circumference of its hexagonal opening. The ribs 201 around the circumference are arranged axially in FIG. 2A and are initiated adjacent to the first opened end 204 of the hidden pivot attachment 101 and terminate in an area adjacent the circumferential recess 203. In some implementations, the ribs 201 form a smooth external surface of the hidden pivot attachment in order to provide a surface that shower assembly components can pivot about. The circumferential recess 203 for accommodating an o-ring is formed by a revolved cut, which provides a radially oriented recessed surface for accepting an o-ring. The hollow passage 200 in the interior of hidden pivot attachment 101 is hollow between the first opened end 204 and the opposite opened end 205, and the portions of the hidden pivot attachment 101 forming the hollow spaces have varying configurations, e.g., threaded, small bore, large bore and hexagonal.

Figure 2B:
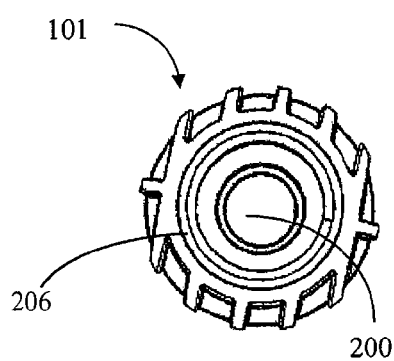
Figure 2C:
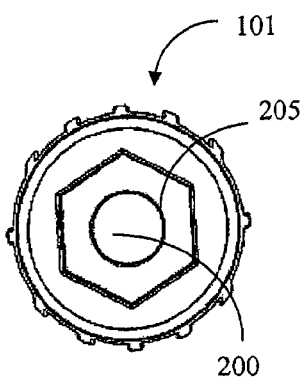

FIG. 2B depicts a top view of hidden pivot attachment 101 that may be attached to pipe P (not shown) via the attachment's recessed threading 206 in hollow passage 200. FIG. 2C depicts a bottom view of the hidden pivot attachment 101, where water from pipe P exits the hollow passage 200 via the hexagonally shaped opened end 205. The hexagonally shaped opened end 205 may be used for installing hidden pivot attachment pipe P.

Figures 2D, 2E:
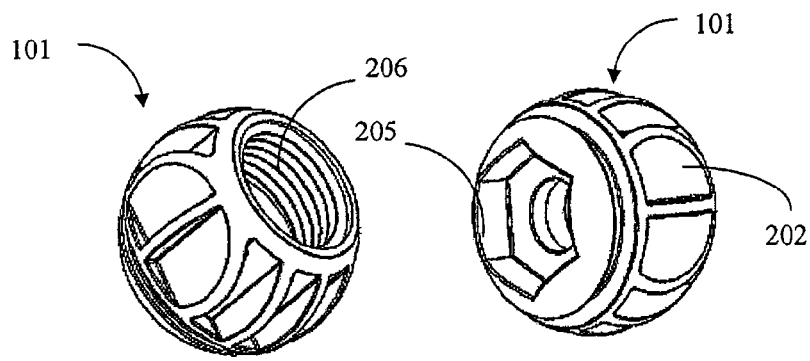
Figure 2F:
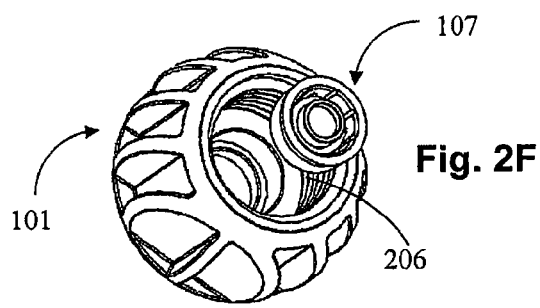

For example, a hex wrench sized to closely fit in the hexagonal shape provided at the opened end 205 of hidden pivot attachment 101 may be used for rotating the hidden pivot attachment 101 about pipe P. FIG. 2D depicts an isometric view showing internal threading 206 recessing into hidden pivot attachment 101, along with the relief structure of the ribs 201 formed on the attachment's exterior circumference. FIG. 2E is another isometric view showing the opened end 205 having the hexagonal opened end 205 in the hidden pivot attachment 101 from which water passes into the rest of the shower assembly, e.g., into a bracket housing 104 or nozzle plate cover 105 for water egress. FIG. 2F is yet another isometric view showing internal threading 206 of hidden pivot attachment 101 and a bore hole arranged in the attachment, beyond the threading, that is sized to fit a removable flow regulator 107.

Figure 3A:
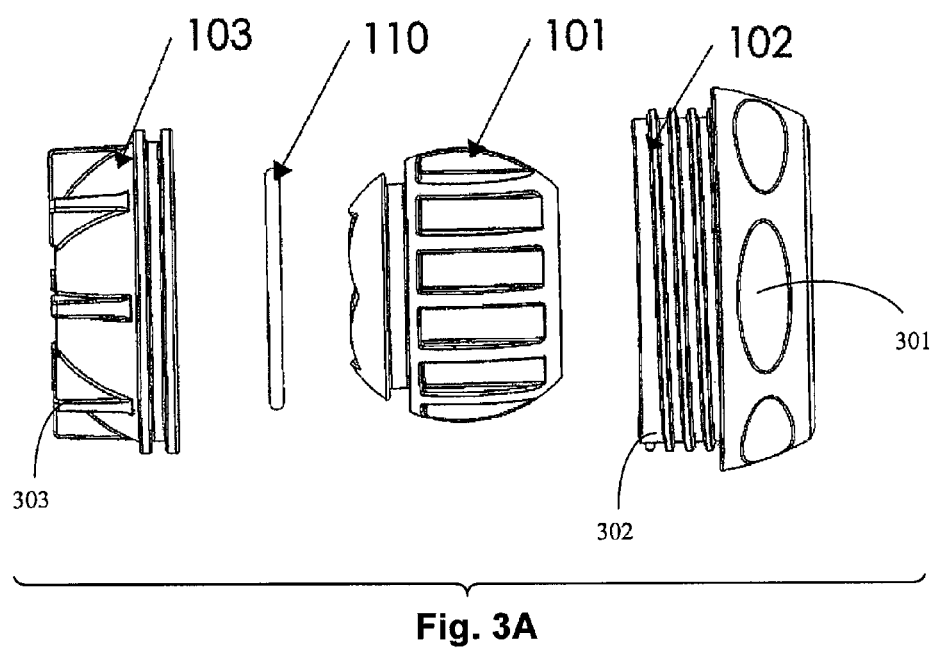
FIG. 3A is an expanded view of a hidden pivot attachment assembly.

FIG. 3A depicts an exploded view of hidden pivot attachment 101, attachment nut 102, seal cup 103, and o-ring 110. The combination of the attachment nut 102 and seal cup 103 form the engagement structure of the shower head to movingly engage the pivot ball, and together form a chamber-like spherical area, i.e., interior void space. The chamber-like spherical area is defined by a wall or walls of the attachment nut 102 and seal cup 103, and has an opened opposing ends, which receives the hidden pivot attachment 101 with o-ring 110. The attachment nut 102 includes a series of indentations 301 arranged around the exterior for providing a gripping surface, which may facilitate rotation of the attachment nut 102 in order to couple or decouple the attachment nut 102 threading 302 with the threading of bracket housing 104 or nozzle plate cover 105. Seal cup 103 includes a series of fins 303 extending outwardly from the rear of the seal cup 103 for properly seating the seal cup in a shower assembly such as bracket housing 104 and nozzle plate cover 105. FIG. 3B depicts a cross-sectional view of the attachment nut 102 and seal cup 103 in close proximity.

From FIG. 3B, the chamber walls are sized to closely fit the shape of hidden pivot attachment 101 to enable the chamber-like spherical area to pivot about hidden pivot attachment 101. For example, ribs 201 separated by recesses 202 provided on the external surface of the hidden pivot attachment and the chamber-like spherical area may be configured so that at least a portion of the ribs are contacting the chamber-like spherical area.

In FIG. 3B, attachment nut 102 is configured with a circumferential wall 304 forming the opening through which a shower pipe first passes through attachment nut 102. The circumferential wall 304 is angularly arranged and may be provided at various angles in order to allow the attachment nut 102 and associated shower assembly to pivot about hidden pivot attachment 101 with a range of motion to a larger or smaller degree. For example, the attachment nut in the assembly in FIG. 1A allows the assembly to pivot about pipe P to a pivot position where pipe P rests against the circumferential wall of the attachment nut. If the circumferential wall were provided at a larger or smaller angle, the shower assembly would be permitted a range of motion that is larger or smaller than that provided by attachment nut 102. Furthermore, with reference to FIG. 5B, the distance the shower assembly can pivot about hidden pivot attachment 101 is defined by the space S between the circumferential wall 304 of attachment nut 102 and pipe P.

In FIG. 3B, seal cup 103 is provided with an opening formed by circumferential wall 305, which allows water to pass out of the chamber-like spherical area. The circumferential wall 305 may be sized so that water freely flows out of the chamber-like spherical area at any position relative to the hidden pivot attachment. According to the embodiment in FIG. 3B, attachment nut 102 and seal cup 103 are arranged so that they are nearly touching. In some embodiments, the attachment nut 102 and seal cup 103 may loosely fit together. In further embodiments, an o-ring may be provided that forms a seal between attachment nut 102 and seal cup 103. It will be understood that each portion forming the chamber-like area may have various configurations while maintaining an internal chamber-like area having a void area that closely accommodates hidden pivot attachment 101.

In addition, from FIG. 3B, the internal walls of the hidden pivot attachment 101 forming the hollow passage 200 include a first opened end 204, internal threading 206, a large bore 307, e.g., for supporting a flow regulator, a small bore 308 and opposite opened end 205 having a hexagonal shape. It will be understood that hidden pivot attachment 101 may include a hollow channel having varying sizes and shapes, and that other channel configurations are contemplated, as would be understood by those of ordinary skill in the art. For example, hidden pivot attachment may have more or less threading along the hollow space compared to the threading depicted in FIG. 3B. In addition, the hollow space may be configured to accept additional components including filter screens, o-rings and other seals (See FIG. 7F).

Figure 4A:
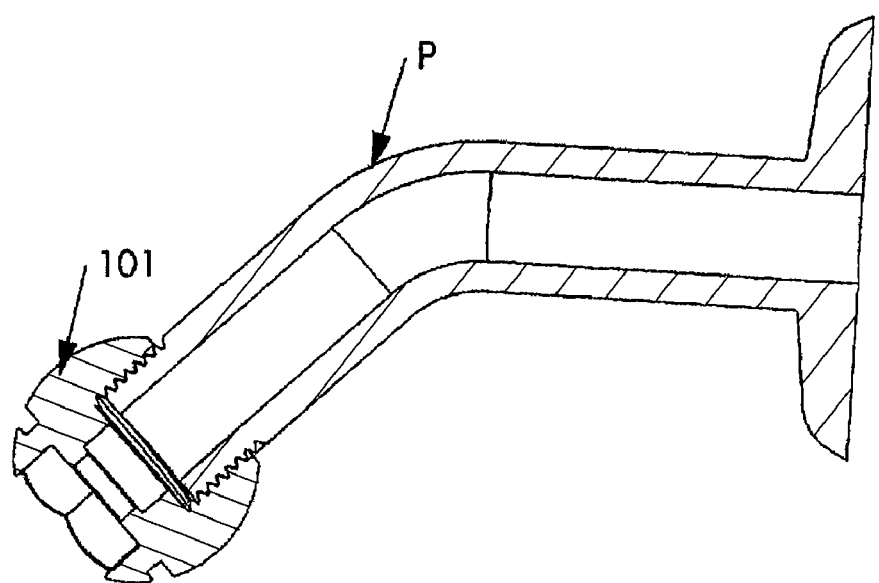
FIG. 4A shows a cross-sectional view of a hidden pivot attachment coupled to a pipe.
Figure 4B:
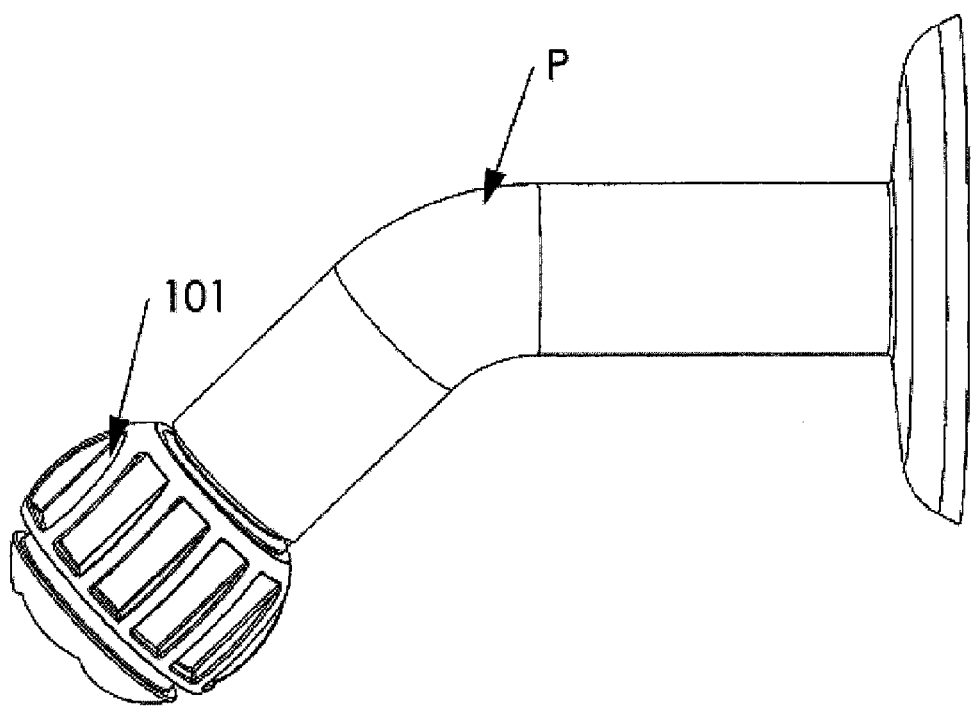
FIG. 4B provides a side-view of a hidden pivot attachment coupled to a pipe.
Figure 5A:
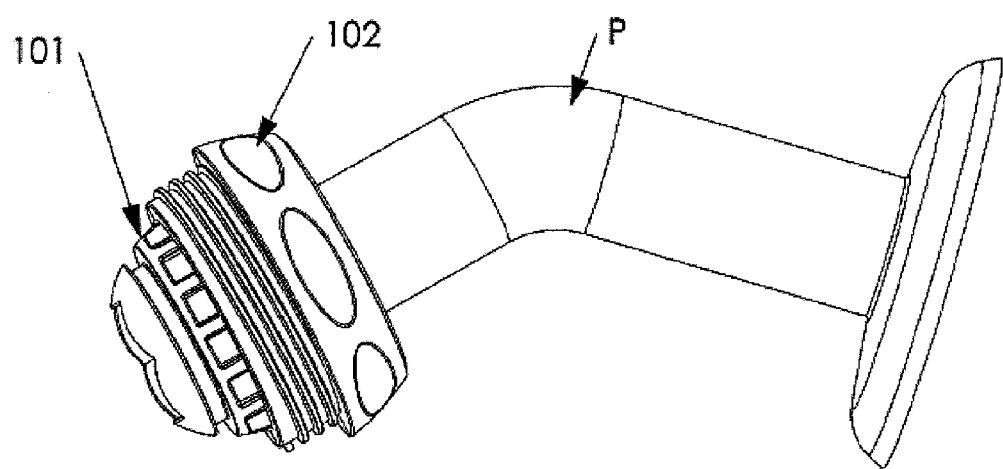
FIG. 5A shows a side-view of the hidden pivot attachment coupled to a pipe, along with an attachment nut.
Figure 5B:
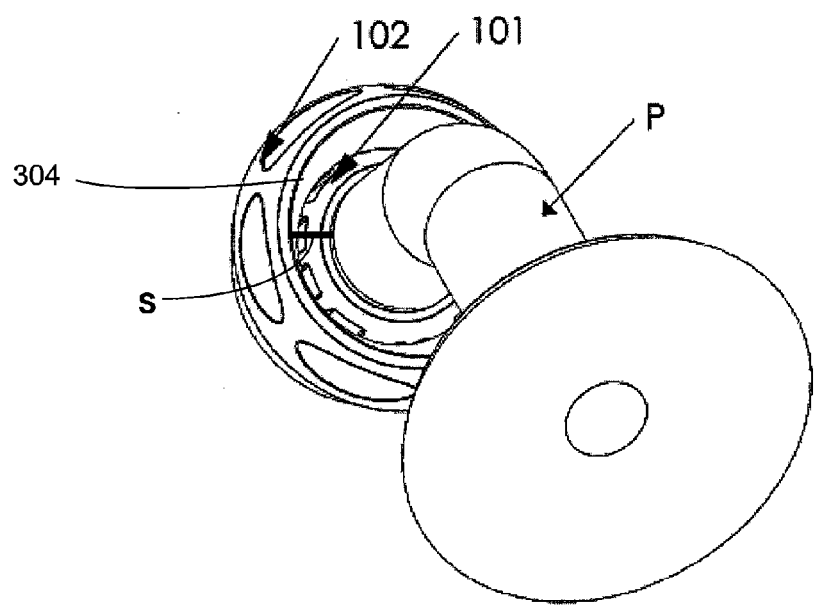
FIG. 5B is a view from the back of the pipe showing the hidden pivot attachment coupled to the pipe, along with an attachment nut.

FIGS. 4A and 4B depict a cross-sectional view and a side-view of hidden pivot attachment 101 coupled to pipe P, respectively. The hidden pivot attachment 101 securely couples to pipe P via its internal threading, and as a result, a separate attachment cylinder is unnecessary in the shower assemblies of the present invention. In each of FIGS. 4A and 4B, a small portion of the pipe threading is visible. According to configurations of the invention, and with reference to 5A, attachment nut 102 fits over a portion of hidden pivot attachment 101 and pipe P, thereby substantially masking the hidden pivot attachment 101 and any additional pipe threading. FIG. 5B shows a view of hidden pivot attachment 101 and attachment nut 102 from the back of pipe P. As can be seen by contrasting FIG. 5A with 5B, hidden pivot attachment 101 is substantially hidden except for when viewing the assembly from a back end.

Although hidden pivot attachment 101 is depicted in conjunction with the shower assemblies and various components thereof in FIGS. 1A-5B, it should be understood that other hidden attachments are also contemplated. FIGS. 6A-F depict various views of another hidden pivot attachment 1001 that may be incorporated in various shower assemblies according to the present invention. Hidden pivot attachment 1001 is similar to hidden pivot attachment 101 because, as depicted in FIGS. 6A-F, hidden pivot attachment 1001 is a cylindrical pivot ball with ribs 2001 around its exterior separated by recesses 2002 and threading 2006 extending into hollow passage 2000 at one end of its interior. However, hidden pivot attachment 1001 differs because it has a recess 2003 for receiving o-ring 1010 formed by a revolved cut located nearer to the water egress opened end 2005 compared to hidden pivot attachment 101. The revolved cut forming the recess 2003 for receiving an o-ring is axially oriented, which allows an o-ring to be easily pressed onto the hidden pivot attachment 1001 in the recessed area. Hidden pivot attachment 1001 also includes an annular opened end 2005 for water egress as opposed to a hexagonal opened end 205 in hidden pivot attachment 101. The annular opened end 2005 is formed by an annular circumferential protrusion 2007, and an o-ring may be fitted around the circumferential protrusion 2007 and/or into the recess formed from the revolved cut. In addition, between the ribs 2001 on the exterior of hidden pivot attachment 1001, additional material, or an inner rib, is provided along a portion of hidden pivot attachment 1001 that corresponds to the location of the threading running in the interior of the hollow passage and the additional material terminates in a shoulder 2008 where the hollow passage becomes narrower and the threading terminates. Further, a first planar surface 2051 and a second planar surface 2052 may be defined on adjacent sides of the pivot attachment between the open ends of the pivot attachment 1001. Moreover, a first surface rib 2053 extends from the pivot attachment to substantially bisect the first planar surface 2051 and a second surface rib fib 2055 extends from the pivot attachment to substantially bisect the second planar surface 2052.

FIGS. 7A-F depict yet another hidden pivot attachment 1101 that may be used in shower assemblies according to various embodiments. The hidden pivot attachment 1101 resembles the hidden pivot attachment provided in FIGS. 6A-F. For example, as shown in FIGS. 7A-F the hidden pivot attachment 1101 may include a hollow passage 2100 through a length of the body, terminating at an open end 2105, similar to the hollow passage 2000 and open end 2005 of the hidden pivot attachment in FIGS. 6A-F. Also, the hidden pivot attachment 1101 may also include a recess 2103 defined circumferentially around a top surface for receiving an o-ring. This recess 2103 is similar to the recess 2003 in the hidden pivot attachment 1001 illustrated in FIGS. 6A-F. However, in this embodiment the hidden pivot attachment 1101 is formed with its own annular surface 2109 running transversely to the hollow passage for forming a seal between it and an attachment nut and/or a seal cup. In some implementations the annular surface 2109 may protrude from hidden pivot attachment 1101. In addition or alternatively, two or more annular surfaces may be provided on hidden pivot attachment 1101 in order to form a seal between in and an attachment nut and/or a seal cup. FIG. 7F is an isometric view of hidden pivot attachment 1101, along with additional components including: filter screen 1102, regulator 1103, and seal 1104 that may optionally be included in the hollow passage.

Moreover, the various views of the hidden pivot attachments provided in FIGS. 2A-2F, 6A-F and 7A-F depict exemplary hidden pivot attachments 101, 1001 and 1101, and it will be understood that even further hidden pivot attachment configurations are contemplated, as would be understood by those of ordinary skill in the art. For example, a hidden pivot attachment may have two external recesses for accepting o-rings in order to form a seal between hidden pivot attachment 101, 1001, 1101 and attachment nut 102 and between hidden pivot attachment 101, 1001, 1101 and seal cup 103. Alternatively, a hidden pivot attachment may be formed without recesses. Ribs provided on the exterior of the hidden pivot attachment may be oriented transversely or at another angle relative to the hollow passageway of the hidden pivot attachment. In addition, the external surface of the hidden pivot attachment that engages with various components of the shower assembly may be relatively smooth and/or may have a relief, e.g., a rough surface or a relief pattern. For example, a relief pattern provided on the exterior of the hidden pivot attachment may enable the shower assembly to pivot about the hidden pivot attachment for positioning, but the relief provided may facilitate holding the assembly in place once a position is selected. All or a portion of the external surface of the hidden pivot attachment may be overmolded to enhance frictional engagement. For example, see U.S. Pat. No. 6,626, 210, which is incorporated by reference in its entirety herein.

The hidden pivot attachment may also have varying shapes, e.g., a semi-spherical shape at one end and an alternative shape at another end. For example, the hidden attachment may have a semi-spherical shape at one end, e.g., an end that is received by seal cup 103, and a cone shape at another end. This may allow the shower assembly to pivot in the seal cup 103 in all directions, e.g., via the semi-spherical portion of the attachment, while enabling the attachment nut to have an interior cone-void space that is complementary to the alternatively shaped portion of the hidden attachment. In addition, the hidden pivot attachment may have a solid exterior surface, which may provide enhanced frictional engagement. In another alternative configuration, a hidden attachment may be cylindrically shaped and aligned longitudinally with pipe P, thus allowing only a rotational adjustment of a shower assembly, e.g., a shower arm. In such an implementation, the attachment nut and seal cup 103 may be suitably formed so that their void space with opened ends resembles the cylindrical shape of the hidden attachment. In another implementation, a cylinder may be aligned perpendicular to the longitudinal axis of the supply pipe, thus allowing only a pivotal adjustment (about a single axis) of a shower assembly, e.g., a shower arm.

Figures 8A, 8B:
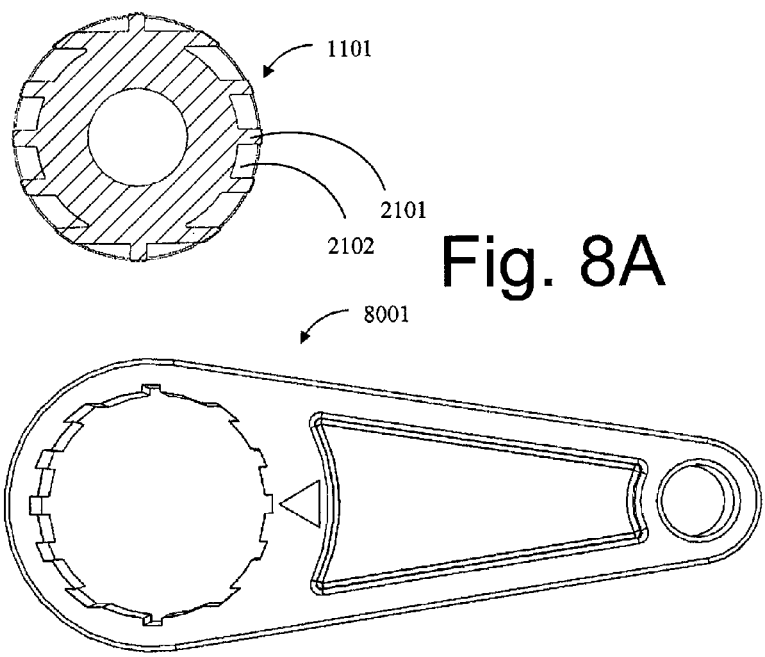
FIG. 8B depicts an attachment wrench.
FIG. 8A depicts a cross-sectional view of a hidden pivot attachment.

Moreover, a hidden pivot attachment may be attached to a water source using a specially made tool. FIG. 8 depicts a cross sectional view of hidden pivot attachment 1101 showing the relief provided by the ribs of hidden pivot attachment 1101. According to various embodiments, a tool such as a spanner wrench 8001 may be provided with an opening sized to receive a portion of the spherically-shaped pivot attachment and shaped to engage with the ribs 2101 and/or recesses 2102 arranged about the circumference. For example, the opening may have a complementary configuration to the relief provided by the ribs 2101 of the hidden pivot attachment. A review of each of the hidden pivot attachments depicted herein, see e.g., FIGS. 2C and 6B and 7B, shows the relief provided by the ribs 201, 2001, 2101 and recesses 202, 2002, 2102 which are complementary to the opening in spanner wrench 8001, and that any of the hidden pivot attachments 101, 1001 and 1101 may be affixed to a water source using spanner wrench 8001. Accordingly, a user may insert the hidden pivot attachment into the spanner wrench 8001 so the water egress passes through the opening of spanner wrench until the protruding ribs of the hidden pivot attachment engage with the complementary recesses in the spanner wrench 8001. A user may place the opened end 204, 2004, 2104 proximate the threaded portion 206, 2006, 2106 of the hidden pivot attachment against a water source by raising the spanner wrench holding the hidden pivot attachment up towards the water source and begin rotating the spanner wrench and hidden pivot attachment about the threading provided on the water source. This may enable a user to more easily assemble their shower assembly because a user may exert torque on the spanner wrench 8001 and transfer the torque to the hidden pivot attachment in order to rotate the hidden pivot attachment around the threading provided on a water source so as to form a threaded engagement. It will be understood that the spanner wrench 8001 is not limited to the configuration provided in FIG. 8, and instead may have any configuration suitable for engaging with any hidden pivot attachment.

Hidden pivot attachments such as those described above may be fabricated using various manufacturing methods including: molding, injection molding, reaction injection molding, machining, pressing and punching. One hidden pivot attachment fabrication method involves providing a machined threaded insert in a mold having a hidden pivot attachment configuration, e.g., the hidden pivot attachment configuration of 101, 1001, 1101 or combinations or variations thereof, and delivering a durable plastic composite at high pressure and/or high temperature into the mold. As a result, the hollow passageway consists of the machined threaded insert, and the rest of the hidden pivot attachment is formed of a highly durable plastic. In another method, the threaded insert may extend from one end of the hidden pivot attachment partly into the molded hidden pivot attachment. Machining a portion of the molded plastic until the threaded insert is reached may form the remainder of the passageway. This allows the passageway to have varying configurations. For example, the passageway may be formed with an arc or at an angle in order to cause water to be delivered from, for example, hidden pivot attachment 101, 1001, 1101 or combinations or variations thereof, at an angle that is different from the water supply's angle of delivery.

Figure 9A:
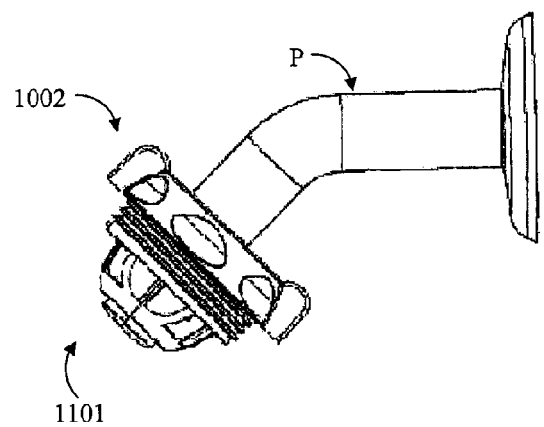
FIG. 9A is a side-view of a hidden pivot attachment coupled to a pipe, along with another attachment nut.
Figure 9B:
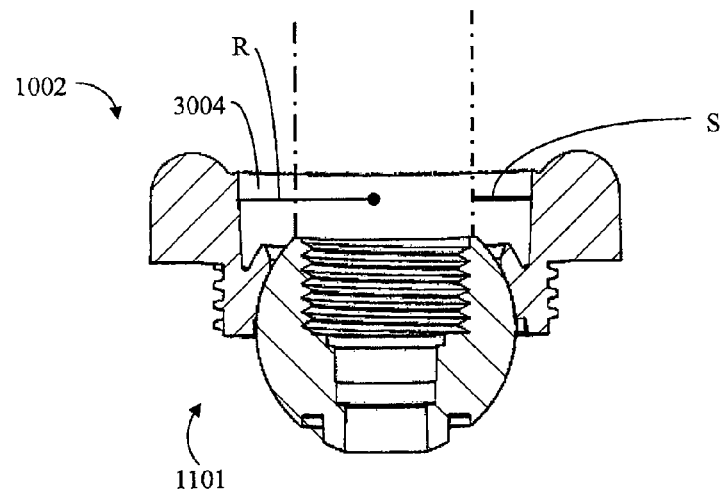
FIG. 9B is a cross-sectional view of the hidden pivot attachment with the attachment nut shown in FIG. 9A.

In addition to the alternative configurations of the hidden pivot attachments described above, other shower assembly components may also have alternative configurations. FIGS. 9A-B depict an alternative configuration of an attachment nut 1002 that may be provided according to certain embodiments. Attachment nut 1002 includes flanges protruding from an exterior in order to facilitate a user rotating the attachment nut 1002. The flanges may provide a user with a surface for exerting rotational torque using their fingers. Accordingly, flanges may assist in threadably engaging or disengaging the attachment nut 1002 to the bracket housing 104 and/or nozzle plate cover 105. For example, during attaching and detaching procedures where the attachment nut 1002 is stuck in place or difficult to rotate, additional rotational force exerted via the flanges may help facilitate movement of the attachment nut 1002 on or off of the bracket housing 104. In addition, if the assembled shower assembly is wet, flanges provide surfaces where a user's fingers will not slip off of the assembly. Furthermore, compared to attachment nut 102, the end of the attachment nut 1002 that first receives pipe P, as seen in the cross-sectional view of attachment nut 1002 and hidden pivot attachment 1101 in FIG. 9B, is longer and has an internal circumferential wall that runs substantially vertically compared to the angled orientation of the corresponding portion of attachment nut 102. As discussed above, the angle of the vertically arranged circumferential wall 3004 affects the range of motion the attachment nut 1002 and shower assembly can pivot about hidden pivot attachment 1101 and pipe P. In certain implementations, the vertically arranged circumferential wall may not be configured with a different angle, but instead may have a larger or smaller radius than the radius R of vertically arranged circumferential wall 3004, which allows the attachment nut 1002 to have a larger or smaller range of motion. However, it will be understood that the circumferential wall 3004 of attachment nut 1002 may be configured with a variety of other radii and other angles in order to provide a desired range of motion.

In alternative configurations, seal cup 103 may be integrated with bracket housing 104, nozzle plate cover 105 or another water delivery device. In addition, it is not critical for seal cup 103 to have a spherical shape. Instead, the seal cup 103 may have a shape that is complementary to the shape of a hidden attachment, e.g., hidden pivot attachment 101, 1001, 1101 or other hidden attachment. Alternatively, seal cup 103 may not have a complementary shape to a hidden attachment, but may instead be configured to cooperate with a hidden attachment. For example, seal cup 103 may include an inner surface with features that guide the movement of a hidden attachment.

Moreover, bracket housing 104 or nozzle plate cover 105 may have external threading and attachment nut 102 may have internal threading that is complementary to the external threading of bracket housing 104. Alternatively, threading may be replaced with some other attachment structure such as clamps, snap locks, sealing o-rings, or other mechanisms that would allow the mating portions of the shower assembly to be securely coupled.

In addition, o-ring 110 may be positioned in a recessed circumferential area of the cup-shaped portion of seal cup 103 rather than coupled to hidden pivot attachment 101, 1001, 1101. In this way, a seal between seal cup 103 and hidden pivot attachment 101, 1001, 1101 are still provided. Similarly, o-ring 113 may be positioned in a recess on the internal surface of bracket housing 104 rather than the external surface of seal cup 103, while still providing a seal between seal cup 103 and bracket housing 104.

In alternative embodiments, the hidden attachment, a seal cup and an attachment nut may be assembled together in a way that allows the hidden attachment to move within the void space of the seal cup and the attachment nut. An opened circumferential portion of the attachment nut would allow the attachment nut to be coupled to a water pipe, and threading on the attachment nut or seal cup would enable the combined structure to be coupled to a shower bracket or nozzle plate, for example.

The shower assemblies of the present invention may be considered to have better aesthetics for the user because the hidden attachment and pipe threading are substantially hidden from view. In addition, because the hidden attachment is substantially hidden, it can be made of a variety of highly durable materials, regardless of their appearance, and without the need for cosmetic treatments, e.g., electroplating, painting or powder coating. Further, shower assemblies may be designed with features that are easily cleanable as compared to other shower assemblies having exposed pipe attachments.

Embodiments of the invention may be combined with various showerhead devices. For example, hidden pivot attachments of the present invention may be used in combination with an ecologically friendly showerhead that is shown and described in U.S. Provisional Patent Application having Application Ser. No. 60/916,146, filed on May 4, 2007 and entitled "Low Flow Showerhead And Method Of Making Same," which is herein incorporated by reference in its entirety. In addition, the hidden pivot attachment 101 may be incorporated with a molded arm for showerheads, which is shown and described in U.S. Provisional Patent Application having Application Ser. No. 60/916,092, filed on May 4, 2007 and entitled "Molded Arm For Showerheads And Method Of Making Same," which is herein incorporated by reference in its entirety.

From the above description and drawings, it will be understood by those of ordinary skill in the art that the particular embodiments shown and described are for purposes of illustration only and are not intended to limit the scope of the present invention. Those of ordinary skill in the art will recognize that the present invention may be embodied in other specific forms without departing from its spirit or essential characteristics. References to details of particular embodiments are not intended to limit the scope of the invention.

What is claimed is:

1. A water supply attachment comprising:
   a generally spherically shaped pivot attachment having a main body defining a hollow passageway therethrough and defining opposing ends with a longitudinal axis extending between the opposing ends;
   a plurality of adjacent ribs extending radially outwardly from the main body on opposite sides of the main body, substantially longitudinally along a length of the main body and extending substantially between one of the opposing ends to the other of the opposing ends, each of the plurality of adjacent ribs defining an outer edge;
   an internal threaded portion extending along a portion of the hollow passageway from one end of the opposing ends;
   an inner rib positioned between at least two adjacent ribs of the plurality of adjacent ribs, the inner rib extending from one end of the at least two adjacent ribs along a portion of a length of each of the at least two adjacent ribs and spaced radially inward from the outer edge of the at least two adjacent ribs, the inner rib terminating at a shoulder substantially perpendicular to the longitudinal axis;
   wherein the shoulder is located at a position along the length of the main body corresponding to a terminal end of the internal threaded portion.

2. The water supply of claim 1, wherein the outer edges of each of the plurality of ribs define the spherical shape of the pivot attachment.

3. The water supply attachment of claim 1, wherein the main body of the pivot attachment further includes an annular ring defined therein, wherein the annular ring is adjacent to one end of the opposing ends and is concentric with the one end of the opposing ends.

4. The water supply attachment of claim 3, wherein the pivot attachment further includes an annular circumferential protrusion extending from the main body concentrically with the annular ring, wherein the annular circumferential protrusion is configured to receive a O-ring.

5. The water supply attachment of claim 1, wherein the main body of the pivot attachment further includes at least one planar surface.

6. The water supply attachment of claim 5, wherein the at least one planar surface further includes a first planar surface positioned on a first side of the pivot attachment and a second planar surface positioned on a second side of the pivot attachment, wherein the passageway is positioned between the first planar surface and the second planar surface.

7. The water supply attachment of claim 6, wherein the pivot attachment further includes
   a first surface rib extending longitudinally along a portion of the length of the main body, and the first surface rib substantially bisects the first planar surface; and
   a second surface rib extending longitudinally along a portion of the length of the main body, and the second surface rib substantially bisects the second planar surface.

* * * * *